(12) United States Patent
Halliday et al.

(10) Patent No.: US 10,775,522 B2
(45) Date of Patent: Sep. 15, 2020

(54) SYSTEMS AND METHODS FOR ATTENUATING NOISE IN SEISMIC DATA AND RECONSTRUCTING WAVEFIELDS BASED ON THE SEISMIC DATA

(71) Applicant: SCHLUMERGER TECHNOLOGY CORPORATION, Sugar Land, TX (US)

(72) Inventors: David Fraser Halliday, Cambridge (GB); Nihed El Allouche, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/624,669

(22) Filed: Jun. 15, 2017

(65) Prior Publication Data

US 2017/0363757 A1 Dec. 21, 2017

Related U.S. Application Data

(60) Provisional application No. 62/350,310, filed on Jun. 15, 2016, provisional application No. 62/350,371, (Continued)

(51) Int. Cl.
*G01V 1/28* (2006.01)
*G01V 1/30* (2006.01)
*G01V 1/16* (2006.01)

(52) U.S. Cl.
CPC .............. *G01V 1/282* (2013.01); *G01V 1/162* (2013.01); *G01V 1/28* (2013.01); *G01V 1/30* (2013.01);
(Continued)

(58) Field of Classification Search
CPC . G01V 1/28; G01V 1/282; G01V 1/30; G01V 1/301; G01V 1/162; G01V 2210/32; G01V 2210/47; G01V 1/3808
See application file for complete search history.

(56) References Cited

U.S. PATENT DOCUMENTS 5,724,241 A 3/1998 Wood et al.
5,971,095 A 10/1999 Ozbek
(Continued)

FOREIGN PATENT DOCUMENTS

CN 1227634 A 9/1999
CN 1664617 A 9/2005
(Continued)

OTHER PUBLICATIONS

Abma, R. et al., "Popcorn shooting: Sparse inversion and the distribution of airgun array energy over time", 83rd Annual International Meeting, SEG, Expanded Abstracts, 201, pp. 31-35.
(Continued)

*Primary Examiner* — Ian J Lobo

(57) ABSTRACT

A method for processing seismic data may include receiving, via a processor, the seismic data acquired via a seismic survey. The seismic survey may include seismic sources that emit seismic wavefields at different locations. Each of the seismic sources may change a directivity pattern of a respective seismic wavefield based on a respective location of the respective seismic source. The seismic survey may also include seismic receivers that may receive the seismic data. The method may also include generating one or more basis functions that correspond to measurements of the seismic data, modelling a signal component of the seismic data as a sum of the one or more basis functions, and storing the signal component in a storage component. The signal component may be used to acquire an image of a subsurface (Continued)

region of the earth for identifying a feature in the subsurface region of the earth.

18 Claims, 16 Drawing Sheets

Related U.S. Application Data filed on Jun. 15, 2016, provisional application No. 62/350,349, filed on Jun. 15, 2016.

(52) U.S. Cl.
CPC .......... *G01V 1/301* (2013.01); *G01V 2210/32* (2013.01)

(56) References Cited

U.S. PATENT DOCUMENTS

| | | |
|---|---|---|
| 6,182,014 B1 | 1/2001 | Kenyon et al. |
| 6,651,007 B2 | 11/2003 | Ozbek |
| 7,257,049 B1 | 8/2007 | Laws et al. |
| 7,492,665 B2 | 2/2009 | Robertsson et al. |
| 7,817,495 B2 | 10/2010 | Ozbek et al. |
| 8,456,950 B2 | 6/2013 | Hegna |
| 8,547,786 B2 | 10/2013 | Griffin et al. |
| 8,712,694 B2 | 4/2014 | Edme et al. |
| 9,310,502 B2 | 4/2016 | Ozdemir et al. |
| 9,594,174 B2 | 3/2017 | Goujon et al. |
| 10,126,452 B2 | 11/2018 | Halliday et al. |
| 2002/0118602 A1 | 8/2002 | Sen et al. |
| 2005/0013194 A1 | 1/2005 | Vaage et al. |
| 2008/0192571 A1 | 8/2008 | Vaage et al. |
| 2008/0275649 A1 | 11/2008 | Ozdemir et al. |
| 2010/0039892 A1 | 2/2010 | Ray et al. |
| 2010/0211320 A1 | 8/2010 | Vassallo et al. |
| 2010/0211321 A1 | 8/2010 | Ozdemir et al. |
| 2010/0271904 A1 | 10/2010 | Moore et al. |
| 2011/0069581 A1 | 3/2011 | Krohn |
| 2011/0182140 A1 | 7/2011 | Lambert et al. |
| 2012/0188845 A1 | 7/2012 | Jeffryes |
| 2012/0250460 A1 | 10/2012 | Edme et al. |
| 2012/0316844 A1 | 12/2012 | Shah et al. |
| 2013/0060544 A1 | 3/2013 | Bakker et al. |
| 2013/0128696 A1 | 5/2013 | Vassallo et al. |
| 2013/0135965 A1 | 5/2013 | Ji et al. |
| 2013/0182533 A1 | 7/2013 | Rentsch-Smith |
| 2013/0182536 A1 | 7/2013 | Vassallo et al. |
| 2013/0329520 A1 | 12/2013 | Van Borselen |
| 2014/0022860 A1 | 1/2014 | Van Borselen et al. |
| 2014/0029378 A1 | 1/2014 | Van Manen et al. |
| 2014/0133274 A1 | 5/2014 | Muijzert et al. |
| 2014/0200812 A1 | 7/2014 | Kitchenside |
| 2014/0211589 A1 | 7/2014 | Maxwell |
| 2014/0219055 A1 | 8/2014 | Goujon et al. |
| 2014/0241117 A1 | 8/2014 | Dellinger et al. |
| 2014/0278116 A1 | 9/2014 | Halliday et al. |
| 2014/0278119 A1 | 9/2014 | Halliday et al. |
| 2014/0316709 A1 | 10/2014 | Ji et al. |
| 2014/0334262 A1 | 11/2014 | Brune |
| 2014/0369161 A1 | 12/2014 | Sallas et al. |
| 2014/0369163 A1* | 12/2014 | Sallas .................. G01V 1/3861 367/16 |
| 2015/0057938 A1 | 2/2015 | Krohn et al. |
| 2015/0066374 A1 | 3/2015 | Ji et al. |
| 2015/0134259 A1 | 5/2015 | Vassallo et al. |
| 2015/0276955 A1 | 10/2015 | Brune |
| 2015/0316667 A1 | 11/2015 | Projetti et al. |
| 2016/0109591 A1* | 4/2016 | Kamil Amin .......... G01V 1/366 367/21 |
| 2016/0202379 A1 | 7/2016 | Sallas |
| 2017/0075015 A1 | 3/2017 | Halliday et al. |
| 2017/0115415 A1 | 4/2017 | Ozbek et al. |
| 2017/0146673 A1 | 5/2017 | Goujon et al. |
| 2017/0184746 A1 | 6/2017 | Halliday |
| 2017/0363756 A1 | 12/2017 | El Allouche et al. |
| 2018/0143338 A1 | 5/2018 | Halliday |
| 2018/0164461 A1 | 6/2018 | Halliday et al. |
| 2019/0004198 A1 | 1/2019 | El Allouche et al. |
| 2019/0079208 A1 | 3/2019 | Halliday et al. |

FOREIGN PATENT DOCUMENTS

| | | |
|---|---|---|
| CN | 101334483 A | 12/2008 |
| CN | 102053272 A | 5/2011 |
| CN | 102269823 A | 12/2011 |
| CN | 103329009 A | 9/2013 |
| EP | 0310253 A2 | 4/1989 |
| WO | 0209014 A1 | 1/2002 |
| WO | 2008152364 A1 | 12/2008 |
| WO | 2010093652 A2 | 8/2010 |
| WO | 2010093739 A2 | 8/2010 |
| WO | 2013105062 A1 | 7/2013 |
| WO | 2014110330 A1 | 7/2014 |
| WO | 2014130040 A1 | 8/2014 |
| WO | 2014152106 A1 | 9/2014 |
| WO | 2014177522 A2 | 11/2014 |
| WO | 2014179282 A1 | 11/2014 |
| WO | 2015011160 A1 | 1/2015 |
| WO | 2015109175 A1 | 7/2015 |
| WO | 2015143189 A1 | 9/2015 |
| WO | 2015168130 A1 | 11/2015 |
| WO | WO-2015168130 A1 * | 11/2015 ............. G01V 1/282 |
| WO | 2016094332 A1 | 6/2016 |
| WO | 2016168280 A1 | 10/2016 |
| WO | 2016179060 A1 | 11/2016 |
| WO | 2016179206 A1 | 11/2016 |
| WO | 2017096081 A1 | 6/2017 |

OTHER PUBLICATIONS

Amundsen, L. et al., "Multicomponent ocean bottom and vertical cable seismic acquisition for wavefield reconstruction", Geophysics, 2010, 75(6), pp. WB87-WB94.

Hampson, G. et al., "Effects of Source and Receiver Motion on Seismic Data", 1990, SEG Technical Program Abstracts, pp. 859-862.

Hopperstad, J. et al., "Fundamental Principles of Isotropic Marine Source Design", B025, 70th EAGE Conference & Exhibition held in Rome, Italy 2008, 5 pages.

Hopperstad, J-F., et al., "Where is the center of a multi-depth marine source array?", 78th SEG 2008 Annual Meeting, Las Vegas, Nevada, USA, pp. 40-44.

Kristiansen, P. et al., "Deepwater OBN—Exploiting data-processing possibilities", SEG Technical Program Abstracts, 2014, pp. 4258-4262.

Linden, D. A., "A Discussion of Sampling Theorems," Proceedings of the IRE, 1959, 47(7), pp. 1219-1226.

Lomb, N. R., "Least squares frequency analysis of unequally spaced data," Astrophysics and Space Science, 1976, 39(2), pp. 447-462.

Mallat, S. et al, "Matching Pursuits with Time-Frequency Dictionaries", IEEE Transactions on Signal Processing, 1993, 41(12), pp. 3397-3415.

Moore, et al., "Simultaneous Source Separation Using Dithered Sources", SEG Las Vegas 2008 Annual Meeting, pp. 2806-2810.

Ozbek, A. et al., "Crossline wavefield reconstruction from multicomponent streamer data: Part 2—Joint interpolation and 3D up/down separation by generalized matching pursuit", Geophysics, 2010, 75(6), pp. WB69-WB85.

Ozdemir, A. K. et al., "Interpolation of Irregularly Sampled Data by Matching Pursuit," G025, EAGE Conference & Exhibition held in Rome, Italy 2008, 5 pages.

Paffenholz, J. et al., "Shear Wave Noise on OBS VZ Data—Part II Elastic Modeling of Scatters in the Seabed", Proceedings of the 75th EAGE Conference & Exhibition, 2006, 5 pages.

Papoulis, A., "Generalized Sampling Expansion", IEEE Transactions on Circuits and Systems, 1977, 24(11), pp. 652-654.

Scargle, J. D., "Studies in Astronomical Time Series Analysis II. Statistical Aspects of Spectral Analysis of Unevenly Sampled Data", Astrophysical Journal, 1982, 263, pp. 835-853.

(56) References Cited

OTHER PUBLICATIONS

Schalkwijk, K. M. et al., "Adaptive decomposition of multicomponent ocean-bottom seismic data into downgoing and upgoing P- and S-waves", Geophysics, 2003, 68(3), pp. 1091-1102.
Vassallo, M. et al., "Crossline wavefield reconstruction from multicomponent streamer data: Part 1—Multichannel interpolation by matching pursuit (MIMAP) using pressure and its corssline gradient", Geophysics, 2010, 75(6), pp. WB53-WB67.
Aki, K. et al., "Quantitative Seismology", New York: Freeman and company, 1980, 10 pages.
Van Dalen, K., "Multi-component acoustic characterization of porous media", PhD thesis, Delft University of Technology, 2011, 174 pages.
Malischewsky, P. et al., "Love's formula and H/V-ratio (ellipticity) of Rayleigh waves", Wave Motion, 2004, 40, pp. 57-67.
Search Report and Written Opinion of International Patent Application No. PCT/US2017/037587 dated Sep. 8, 2017, 17 pages.
International Preliminary Report on Patentability of International Patent Application No. PCT/US2017/037587, dated Dec. 27, 2018, 13 pages.
Office Action received in U.S. Appl. No. 15/624,403 dated Mar. 13, 2019, 11 pages.
International Preliminary Report on Patentability of International Patent Application No. PCT/US2017/037586, dated Dec. 27, 2018, 11 pages.
Search Report and Written Opinion of International Patent Application No. PCT/US2017/037586, dated Sep. 8, 2017, 14 pages.
Office Action received in U.S. Appl. No. 15/624,669 dated Aug. 31, 2018, 7 pages.
International Preliminary Report on Patentability for International Patent Application No. PCT/US2016/030344, dated Nov. 16, 2017, 12 pages.
Search Report and Written Opinion of International Patent Application No. PCT/US2016/030636, dated Aug. 12, 2016, 15 pages.
International Preliminary Report on Patentability of International Patent Application No. PCT/US2016/030636, dated Nov. 16, 2017, 12 pages.
Search Report in European Patent Application No. 16789960.8 dated Nov. 19, 2018, 3 pages.
Search Report and Written Opinion of International Patent Application No. PCT/US2015/028002 dated Jul. 24, 2015, 9 pages.
International Preliminary Report on Patentability of International Patent Application No. PCT/US2015/028002, dated Nov. 10, 2016, 7 pages.
Supplementary Search Report of European Patent Application No. 15785227.8, dated Nov. 10, 2017, 3 pages.
Search Report in European Patent Application No. 15785227.8, dated Mar. 12, 2018, 7 pages.
First Office Action and Search Report issued in Chinese Patent Application No. 201580025632.6, dated Mar. 23, 2018, 21 pages.
Second Office Action issued in Chinese Patent Application No. 201580025632.6, dated Feb. 21, 2019, 18 pages.
Search Report and Written Opinion of International Patent Application No. PCT/US2016/064481, dated Mar. 17, 2017, 18 pages.
International Preliminary Report on Patentability of International Patent Application No. PCT/US2016/064481, dated Jun. 14, 2018, 15 pages.
First Chinese Office Action issued in Chinese Patent Application No. 2016800754152, dated Sep. 22, 2019, 10 pages.
Supplementary Partial European Search Report issued in related European Patent Application No. 16871528.2 dated Aug. 19, 2019, 7 pages.
Notice of Allowance issued in U.S. Appl. No. 15/307,742, dated Jun. 14, 2019, 9 pages.
Osen et al., "Removal of water-layer multiples from multicomponent sea-bottom data", Geophysics, 64 (3), May-Jun. 1999, pp. 838-851.
Office Action issued in U.S. Appl. No. 15/624,403, dated Oct. 31, 2019, 11 pages.
Search Opinion and Exam Report in European Patent Application No. 16789960.8, dated May 16, 2019, 5 pages.
First Office Action issued in Chinese Patent Application No. 2016800754152, dated Aug. 27, 2019, 10 pages.
Extended European Search Report and Exam issued in European Patent Application No. 16871528.2, dated Jan. 3, 2020, 15 pages.
First Exam Report of Gulf Cooperation Council Patent Application No. P/2016/32488 dated Dec. 18, 2019, 6 pages.

\* cited by examiner

SYSTEMS AND METHODS FOR ATTENUATING NOISE IN SEISMIC DATA AND RECONSTRUCTING WAVEFIELDS BASED ON THE SEISMIC DATA

CROSS-REFERENCE TO RELATED APPLICATION

This application claims priority to and the benefit of U.S. Provisional Application No. 62/350,310, entitled "A METHOD OF ACQUIRING SEISMIC DATA," filed Jun. 15, 2016, which is hereby incorporated by reference in its entirety for all purposes. This application also claims priority to and the benefit of U.S. Provisional Application No. 62/350,371, entitled "A METHOD OF ACQUIRING AND PROCESSING SEISMIC DATA," filed Jun. 15, 2016, which is hereby incorporated by reference in its entirety for all purposes. In addition, this application claims priority to and the benefit of U.S. Provisional Application No. 62/350,349, entitled "A METHOD OF RECONSTRUCTING A DATASET," filed Jun. 15, 2016, which is also hereby incorporated by reference in its entirety for all purposes.

This application is related to International Publication No. WO 2016/179060, International Publication No. WO 2016/179206, and International Publication No. WO 2015/168130, each of which is hereby incorporated by reference in its entirety for all purposes. This application is also related to U.S. Provisional Patent Application No. 62/261,934, which is hereby incorporated by reference in its entirety for all purposes.

BACKGROUND

The present disclosure relates generally to systems and methods for processing seismic data acquired by one or more seismic receivers to identify locations of hydrocarbon formations or deposits within subterranean regions of the earth. Seismic exploration involves surveying subterranean geological formations for hydrocarbon deposits. A survey typically involves deploying seismic source(s) and seismic receivers at predetermined locations at or near the surface of the Earth. The sources generate seismic waves, which propagate into the subterranean geological formations creating pressure changes and vibrations along the way. Changes in elastic properties of a geological formation scatter the seismic waves, changing the direction of propagation and other properties of the seismic waves. Part of the energy emitted by the sources is reflected back from the geological formations toward the surface and reaches the seismic receivers. Some seismic receivers are sensitive to pressure changes (e.g. hydrophones), others to particle motion (e.g. geophones), and surveys may deploy only one type of receiver or both.

In response to the detected seismic events, the receivers generate electrical signals to produce seismic data. Analysis of the seismic data can be processed to indicate the presence or absence of probable locations of hydrocarbon deposits. Additionally, seismic sources and receivers may be used to monitor hydrocarbon production from a subterranean reservoir and/or other fluid flow within the reservoir.

Some surveys are known as "marine" surveys because they are conducted in marine environments, which may include saltwater environments, fresh water environments, and brackish water environments. In one type of marine survey, called a "towed-array" survey, an array of seismic receiver-containing streamers is towed behind a survey vessel which also tows one or more seismic sources. A possible alternative, or addition, to the use of towed streamers is the use of ocean bottom cables or ocean bottom nodes which contain seismic receivers. Unlike streamers, these lay on the sea bed and do not move during recording of seismic data. In such a survey the seismic sources may be towed by a vessel. There are also survey procedures in which the seismic sources are stationary (e.g. attached to a moored buoy).

Regardless of whether the receivers and seismic source(s) are moving or stationary, the received data can incorporate effects resulting from the methodology used to generate the seismic waves which penetrate into the subterranean and/or undersea geological formation. These source-side acquisition effects include signatures of the seismic sources, radiation patterns, residual shot noise, data irregularity, sparse data sampling, effects from the use of more than one seismic source, effects from motion of the seismic source (e.g., if it is moving while data is being acquired), the effect of the water surface above the seismic source(s), and the like. As such, the seismic data collected at the receivers (i.e. the seismic measurements made by the receivers) may be processed to remove or reduce artifacts which do not correspond to features of the geological formations that are being surveyed.

BRIEF DESCRIPTION OF THE DRAWINGS

The present disclosure is best understood from the following detailed description when read with reference to the accompanying drawings. Like characters represent like parts throughout the drawings. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
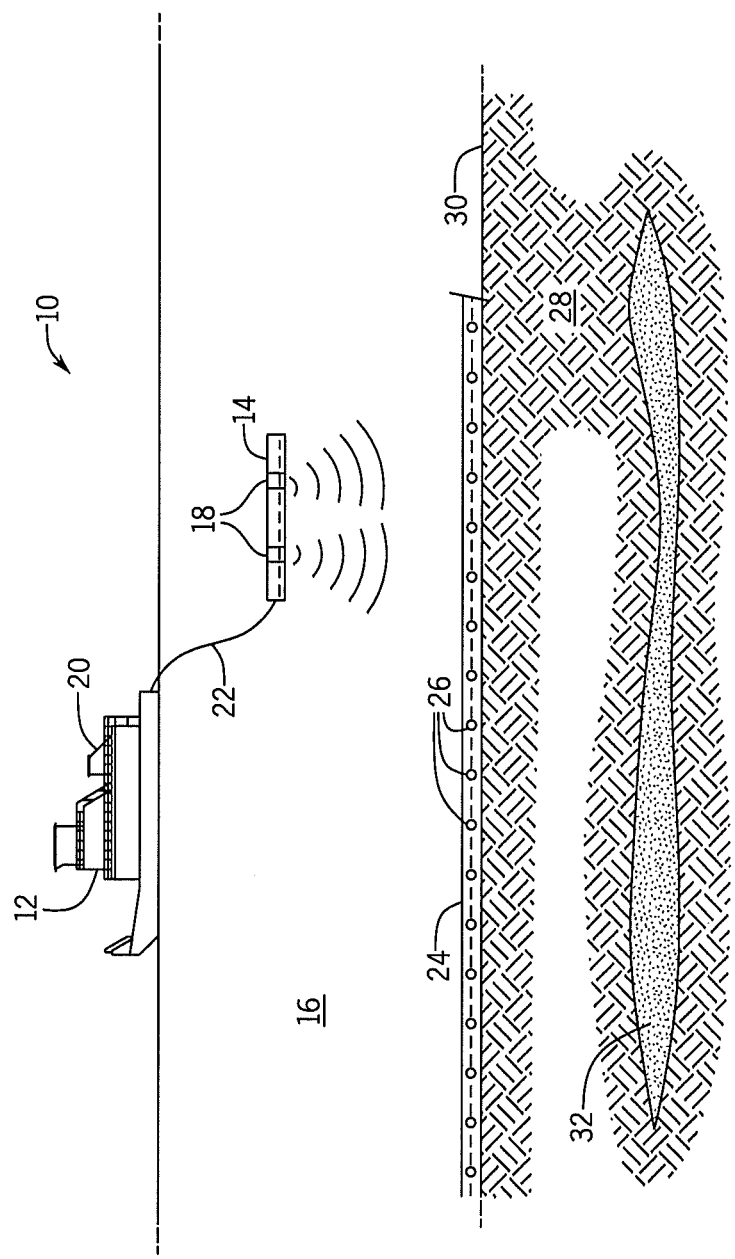
FIG. 1 illustrates a schematic view of a seismic marine survey arrangement that includes a seismic vibrator array and ocean bottom receivers, in accordance with one or more embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, seismic data acquired using marine seismic survey in shallow water (e.g., less than 300 m depth) differs from seismic data acquired in deeper water (e.g., greater than 300 m depth). For example, the seismic data acquired in shallower water depths may include certain properties such as a Scholte wave and other coherent noise similar to noise (e.g., ground roll) acquired during land seismic acquisition.

For example, a marine survey design may account for a minimum expected velocity of propagation for seismic (e.g., acoustic) wavefields to travel across seismic source and/or receiver arrays of the marine survey design. As such, in marine survey designs using ocean bottom nodes (OBN) in deeper water, a minimum velocity of the propagation of the seismic wavefields across the source array may correspond to a speed of sound in water. Using this minimum velocity of propagation, seismic data acquisition parameters (e.g., distance between seismic receivers) for the seismic receiver may be determine based on the speed of sound in water. However, in shallower water, a Scholte wave may be slower than the speed of sound in water. This slower velocity (at least at the Scholte wave frequencies) may cause seismic data processing (e.g., source side reconstruction) over large distances to be difficult and may produce seismic wavefields with significant noise components that reduce the ability of the wavefields to accurately indicate locations of hydrocarbon formations within the earth.

In addition to the source side sampling/reconstruction problem (e.g., removal of effects due to positioning and interference of seismic sources) described above, marine survey designs that use ocean bottom nodes arrange seismic receivers on the seabed with spacing between each seismic receiver of approximately 300 to 400 m. This amount of distance between each seismic receiver reduces the effectiveness of seismic data processing processes that use multiple seismic datasets acquired by multiple receivers (e.g., array processing). As such, the OBN seismic data acquired by multiple seismic receivers are processed individually using data acquired by each respective seismic receiver.

With the foregoing in mind, to perform effective array-based seismic data processing (e.g., noise attenuation) in shallower water depths, seismic receivers along an Ocean Bottom Cable (OBC) may be separated by approximately 25 to 50 m, thereby involving an increased number of seismic receivers as compared to the OBN survey mentioned above. As such, certain embodiments of the present disclosure are directed towards performing seismic data processing on seismic data acquired by seismic receivers disposed at various distances apart while attenuating noise that may be present in the seismic data due to the shallow water depths, receiver distances, and the like.

Indeed, in some embodiments, a computer system may receive seismic data acquired via a marine seismic survey and may process the seismic data using certain algorithms (e.g., Extended Generalized Matching Pursuit (EGMP)) that employ gradient data (e.g., pressure gradient, spatial velocity gradient) to identify wavefield components corresponding to coherent noise in the seismic data and remove the identified wavefield components from the input seismic data without performing any interpolation/reconstruction step.

In addition, in some embodiments, a computer system may employ a unified seismic data processing framework for simultaneous source separation and receiver reconstruction to perform source-side reconstruction while performing coherent noise attenuation using a multi-channel method. The combination of the source-side reconstruction and multichannel (i.e., with gradients) noise attenuation provide for improved seismic data processing that enables marine seismic surveys to employ seismic receivers at larger distances apart, thereby increasing the efficiency of the marine seismic survey. Additional details with regard to performing the seismic data processing in accordance with the techniques described above are provided below with reference to FIGS. 1-19.

In certain embodiments, different sensors may be incorporated into seismic receivers to acquire seismic data that may enable the unified seismic data processing framework described above to perform various types of seismic data processing. These sensors, in one example, may include a four-component sensor that measures particle velocity in three directions along with pressure and at least one other sensor that measures another property associated with the location of the seismic receiver. That is, the at least one other sensor may measure a single particle velocity component, two particle velocity components, three particle velocity components, pressure, or any other suitable property. The acquired data from these seismic receivers may enable the seismic data processing techniques described herein to be performed more effectively. Additional details with regard to the seismic receivers used to acquire seismic data to perform various types of seismic data processing techniques described herein are provided below with reference to FIGS. 20-28.

By way of introduction, FIG. 1 illustrates a schematic diagram of an example marine seismic survey 10 arrangement that includes a marine vessel 12 that tows a seismic vibrator array 14 through a body of water 16. The seismic vibrator array 14 may include seismic vibrators 18 that can be activated in response to activation signals produced by a controller 20. The controller 20 may provide the activation signals via a link 22 to the seismic vibrator array 14. In the example of FIG. 1, a series 24 of seismic receivers 26 (sensors) are deployed on the water bottom 30 (e.g., seafloor or seabed). The receivers 26 may be deployed in a cable (e.g., ocean bottom cable) or nodal (e.g., ocean bottom node) form. In certain embodiments, the disposition of the seismic receivers 26 may include without limitation directly or indirectly at or in proximity to the water bottom 30 (e.g., seafloor or seabed), with or without physical contact to the water bottom 30 (e.g., seafloor or seabed), coupled to the water bottom 30 (e.g., seafloor or seabed), and the like.

The seismic receivers 26 may detect wavefields reflected from a subsurface structure 28 that is underneath an earth surface (e.g., under the water bottom 30, seafloor, or seabed). The seismic receivers 26 may be capable of receiving reflected seismic wavefields having at least four properties (e.g., particle velocities, particle accelerations pressure, and/or other wavefield properties). In some embodiments, the seismic receivers 26 may be four-component (4C) seismic receivers that may receive seismic data having four properties in addition to at least one or more gradients of the four components. In addition, the seismic receivers 26 may measure characteristics of wave propagation such as the ellipticity of the wavefield at the seismic receiver 26. The subsurface structure 28 can include one or multiple subsurface elements of interest 32. Source wavefields propagated by the seismic sources 18 are propagated into the subsurface structure 28. The subsurface structure 28 reflects a part of the source wavefields, such that the reflected wavefields are detected by the seismic receivers 26. Measured data (e.g., seismic data) acquired by the seismic receivers 26 can be communicated to the controller 20 for storage or for processing. Although FIG. 1 describes data being communicated via the controller 20, it should be noted that the controller 20 may include any suitable computing device having one or more processors.

The seismic vibrators 18 in the seismic vibrator array 14 can be controlled to either be in-phase or out-of-phase to cause production of an omnidirectional source wavefield or a source gradient wavefield, respectively. The controller 20 may send activation signals to the seismic vibrator array 14 to cause the seismic vibrator array 14 to produce an omnidirectional source wavefield in a first shot (e.g., first activation of the seismic vibrator array 14) and to produce a source gradient wavefield in a second shot. The seismic vibrator array 14 may also be referred to as a marine vibrator source or a marine vibrator. In certain embodiments described herein, the seismic vibrator array 14 may emit source wavefields with alternating directivity patterns. Additional details regarding the seismic vibrators 18 discussed herein may be found in International Publication No. WO 2016/179060, which is incorporated herein by reference above. Although FIG. 1 provides details with regard to a marine seismic survey, it should be noted that the processing techniques described below may be performed, in some embodiments, on land seismic surveys as well.

After the seismic data (e.g., reflected seismic wavefields) is acquired by the seismic receivers 26, the seismic data may be stored via a storage component, database, or the like. The seismic data may then undergo seismic data processing to convert the raw seismic data into wavefield data that may be used to identify hydrocarbon formations or other geological features within the subsurface structure 28. In some embodiments, the seismic data processing may also remove noise components and other artifacts that may be present in the seismic data.

Figure 2:
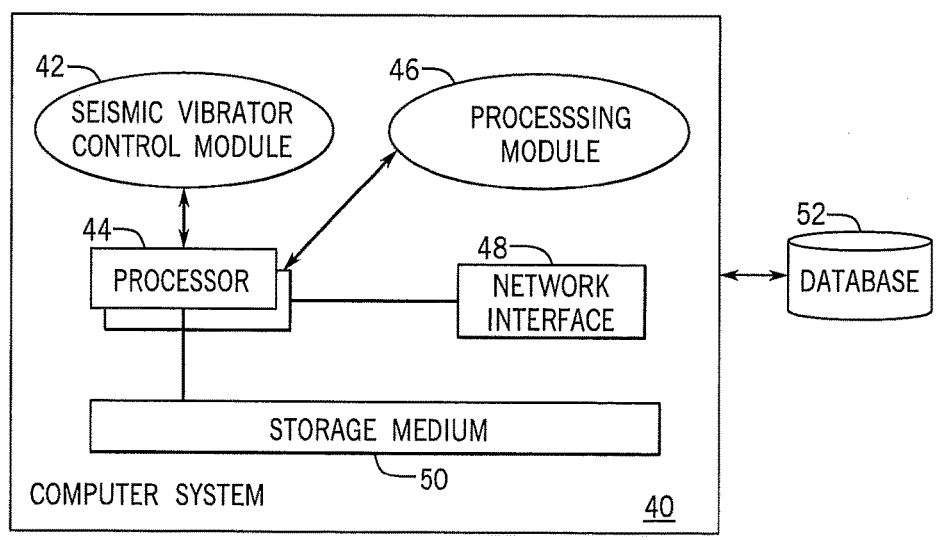
FIG. 2 illustrates a block diagram of a computer system that may perform one or more of the seismic data processing on seismic data acquired via the seismic marine survey arrangement of FIG. 1, in accordance with one or more embodiments of the present disclosure.

With the foregoing in mind, FIG. 2 illustrates a block diagram of a computer system 40 that may perform various types of seismic data processing of the present disclosure. It should be noted that the computer system 40 may also be part of the controller 20 shown in FIG. 1. In some embodiments, the computer system 40 may include a seismic vibrator control module 42, which may be executable on one or multiple processors 44 to control seismic vibrators of the seismic vibrator array 14 via the controller 20. The computer system 40 may also include a processing module 46, which may also be executable on the processor(s) 44 to perform any of the tasks discussed below. In addition, the processing module 46 may perform a variety of seismic data processing techniques, such as crossline reconstruction, in-line reconstruction, up-down source side wavefield reconstruction, and/or multi-component imaging, and the like. It should be noted that the processing module 46 may be provided in a computer system that is separate from a computer system including the seismic vibrator control module 42. The processor(s) 44 can be coupled to a network interface 48 (to allow the computer system 40 to communicate over a network) and a storage medium (or storage media) 50, to store data and machine-executable instructions.

The storage medium (or storage media) 50 can be implemented as one or more non-transitory computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution. It should be noted that the components described above with regard to the computer system 40 are examples and the computer system 40 may include additional or fewer components as shown.

In some embodiments, the seismic data acquired via the seismic receivers 26 may be stored in a database 52 or other storage component. The database 52 may be accessible to the computer system 40 via the network interface 48 or some other communication protocol. In addition, after the computer system 40 performs the seismic data processing, the resulting seismic data (e.g., noise attenuated) may be stored in the database 52.

Keeping the foregoing in mind, the embodiments described herein are related to combining the seismic data processing techniques related to seismic data acquired using seismic source arrays (e.g., seismic vibrator array 14) and seismic receiver arrays (e.g., series 24 of seismic receivers 26). Prior to discussing the combined approach for processing seismic data, it may be useful consider the case of processing seismic data received via a receiver array deployed on a seabed with a single seismic source in the water, as illustrated in FIG. 3.

Figure 3:
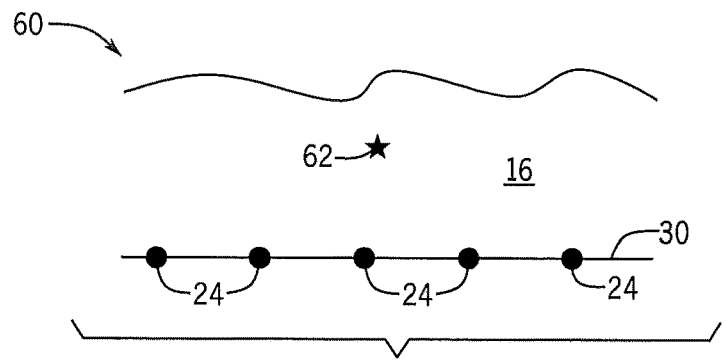
FIG. 3 illustrates a schematic diagram of seismic survey geometry having one seismic source and multiple seismic receivers, in accordance with one or more embodiments of the present disclosure.

Referring to FIG. 3, a seismic survey geometry 60 illustrates a single seismic source 62 (e.g., seismic vibrator 18) disposed within the water 16 and a number of seismic receivers 26 disposed on a water bottom (e.g., seafloor or seabed) 30. In one embodiment, each seismic receiver 26 of FIG. 3 may include at least one pressure sensor to measure a pressure value and at least one additional pressure sensor to measure a horizontal gradient of the pressure value. In certain embodiments, the seismic receivers 26 may be sampled at a spatial interval of approximately 100 m, which is beyond the Nyquist interval for some shallow water data.

Figure 4:
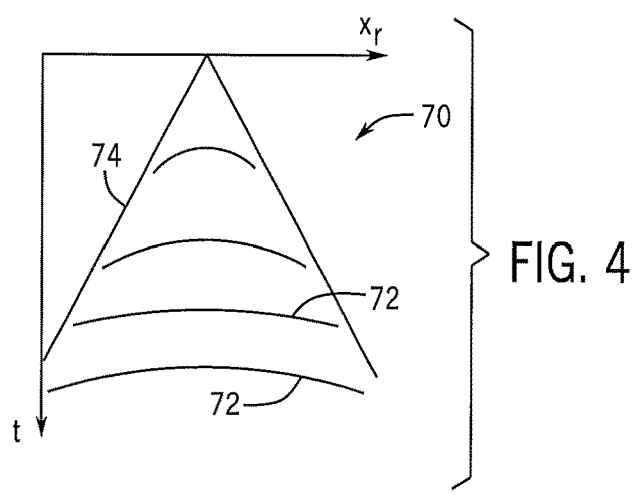
FIG. 4 illustrates example seismic wavefields of a common source gather that may be acquired via a seismic survey geometry of FIG. 3, in accordance with one or more embodiments of the present disclosure.

After the seismic source 62 is activated and the seismic receivers 26 acquire the reflected seismic wavefields, the computer system 40 or other suitable processing device may collect the reflected seismic wavefields as a common-shot gather. An example common-shot gather 70 is illustrated in FIG. 4. Referring to FIG. 4, the common-shot gather 70 may include a collection of reflected seismic wavefields 72. In addition to the reflected seismic wavefields 72, the common-shot gather 70 may include noise components 74, such as a Scholte wave and/or the like.

Figure 5:
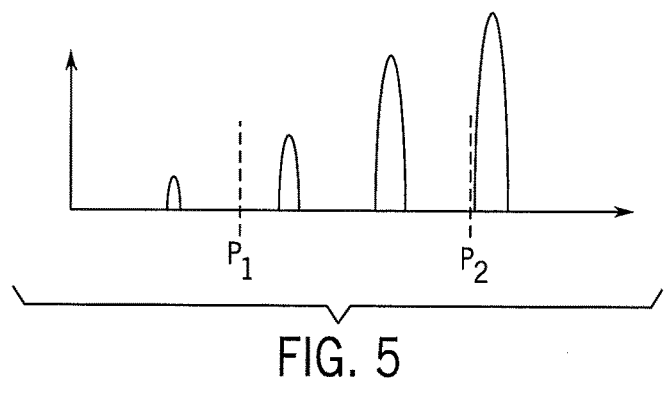
FIG. 5 illustrates a diagram of a cost function that may be associated with the common source gather of FIG. 4, in accordance with one or more embodiments of the present disclosure.

Based on the common-shot gather 70, the computer system 40 may determine a cost function of a portion of the reflected seismic wavefields 72. For example, FIG. 5 illustrates a slowness spectrum (e.g., cost function) for a single frequency of a window 76 of the common-shot gather 70. The slowness spectrum may be used to identify which parts of the common-shot gather 70 correspond to noise and which parts correspond to the desired signal (e.g., reflected seismic wavefields). For instance, in FIG. 5, $p_1$ and $p_2$ correspond to cut-off slowness values that may be used to distinguish between noise (e.g., Scholte wave) and the desired signal. In other words, coherent noise in the acquired seismic data can be characterized by a defined range of slowness (e.g., a slowness range $p_1$ to $p_2$), outside of which the reflected seismic wavefields may include coherent noise.

In certain embodiments, the slowness spectrum may be based on a planewave decomposition of the acquired seismic data and may corresponds to the cost function solved using a multichannel interpolation by matching pursuit (see, e.g., WO 2015/168130) or the like.

Applying the multichannel interpolation by matching pursuit method to the cost function of FIG. 5 may include iteratively minimizing at each iteration by: (1) selecting the strongest (e.g., largest) component in the cost function (e.g., slowness transform); (2) computing the amplitude corresponding to this component; (3) forward modelling the desired output wavefield (e.g., an interpolated version of the input) using the amplitude and corresponding plane wave component; (4) using the computed amplitude to forward model the contribution of the component to the input; and (5) subtracting this contribution from the input data. In order to distinguish the correct slowness from the noise components, the computer system 40 may use the gradient of the wavefield acquired by the seismic receivers 26, as described by International Publication No. WO 2015/168130.

Figure 6:
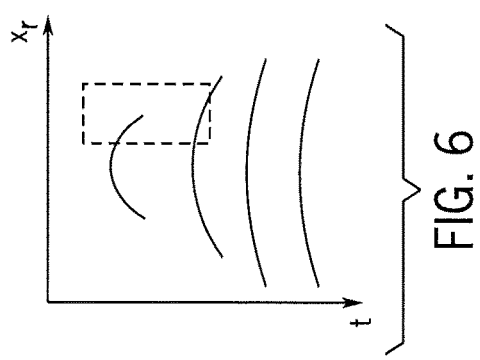
FIG. 6 illustrates a schematic example of seismic wavefields of a common-source gather that may be acquired via a seismic survey geometry of FIG. 3 without noise components, in accordance with one or more embodiments of the present disclosure.

With the foregoing in mind, when attempting to obtain a de-noised version of the acquired seismic data, the computer system 40 may not compute the desired interpolated output wavefield (e.g., step (3)—forward modelling the desired output wavefield), as provided in the multichannel interpolation by matching pursuit method. Instead, since the coherent noise in the seismic data can be characterized by a defined range of slowness (e.g., a slowness outside the range $p_1$ to $p_2$), the computer system 40 may modify the EGMP workflow detailed above, to model the noise contribution in the seismic data, rather than interpolating the desired output wavefield, using the chosen component. That is, if the chosen component lies within the range of slowness $p_1$ and $p_2$, the computer system 40 may add the modeled contribution is added to a signal output. Alternatively, if the chosen component lies outside of the range of slowness $p_1$ and $p_2$, the computer system 40 may add the modeled contribution to a noise output. As a result, the computer system 40 may generate a noise estimate and a signal estimate. An example signal estimate is sketched in the schematic of FIG. 6. As shown in FIG. 6, the noise components 74 previously included in the common-shot gather 70 of FIG. 4 have been removed, thereby leaving the signal estimate (which can also be added back to the residual to preserve any remaining weak events, if desired).

Figure 7:
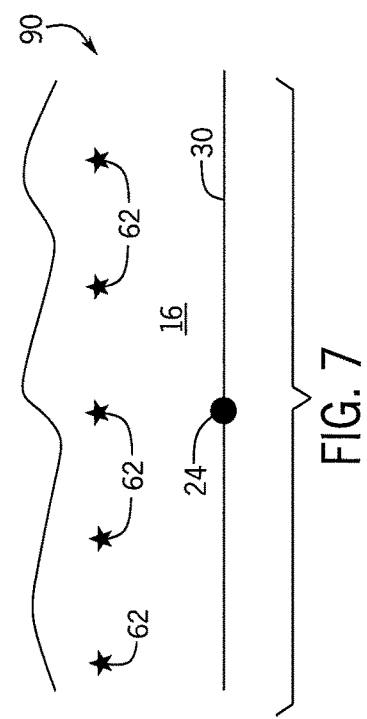
FIG. 7 illustrates a schematic diagram of seismic survey geometry having multiple seismic sources and one seismic receiver, in accordance with one or more embodiments of the present disclosure.

In addition to a common-shot gather, the acquired seismic data may be organized according to a common-receiver gather. For example, FIG. 7 illustrates an example survey geometry 90 that corresponds to a common-receiver gather, which includes a number of seismic sources 62 located in the water 16 and a single seismic receiver 26 located on the water bottom (e.g., sea floor or seabed) 30. In one embodiment, the seismic sources 62 are marine vibrators that may emit seismic wavefields with alternating directivity patterns as described in International Publication No. WO 2015/143189 (hereinafter Halliday 2014), which is incorporated by reference above. The alternating directivity patterns may enable multi-channel interpolation on the source side. The multi-channel interpolation may also include joint processing to deal with other acquisition effects as described by Halliday 2014. By using the multi-channel interpolation, the computer system 40 may use seismic data acquired by the seismic receiver 26 with spacing beyond the spatial Nyquist interval (e.g., a spacing of 90 m).

Figure 8:
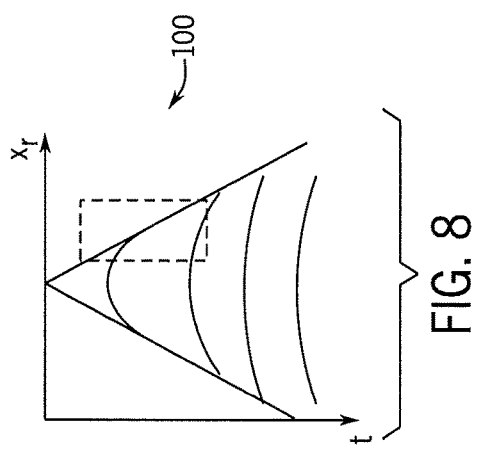
FIG. 8 illustrates example seismic wavefields of a common-receiver gather that may be acquired via a seismic survey geometry of FIG. 7, in accordance with one or more embodiments of the present disclosure.
Figure 9:
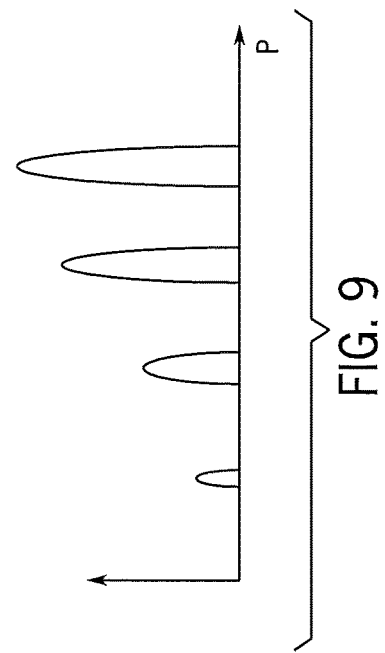
FIG. 9 illustrates a diagram of a cost function that may be associated with the common receiver gather of FIG. 8, in accordance with one or more embodiments of the present disclosure.

Due to the issues that arise when performing seismic data acquisition in shallow water described above, a common-receiver gather 100, as illustrated in FIG. 8, may be similar in appearance to the common-source gather 70 of FIG. 4. Thus, the cost function of the common-receiver gather 100, as depicted in FIG. 9, is similar to the common-source gather 70, as depicted in FIG. 4. In certain embodiments, the seismic data acquired by the common-receiver gather may be reconstructed using a similar scheme described above (where the cost function is iteratively minimized) to give a dense source output. It should be noted that the computer system 40 may be used to limit the output of the reconstruction to exclude unwanted events (e.g., ghost waveforms, replicas, noise) from the interpolated output.

Joint Source Wavefield Reconstruction and Noise Attenuation

With the foregoing in mind, the computer system 40 may process seismic data acquired via a common-source gather and a common-receiver gather using similar techniques (e.g., matching pursuit based processing) to remove coherent noise from aliased receiver data and to reconstruct aliased source data. To remove coherent noise, the computer system 40 may use seismic data having receiver gradients. To reconstruct the aliased source data, the computer system 40 may use seismic data that is acquired via marine vibrators that emit seismic wavefields with different directivities or directionalities. In certain embodiments, the computer system may process seismic data using a combination of both techniques. That is, the computer system 40 may process seismic data acquired with marine vibrators emitting wavefields with different directionalities recorded by, for example, pressure sensors and pressure gradient sensors, such that the seismic data can be simultaneously reconstructed on the source side and de-noised on the receiver side. The resulting seismic data would include seismic data from a dense grid of reconstructed shot points with coherent noise removed. As such, the computer system 40 may overcome the issues that slowly propagating coherent noise may produce on source-side reconstruction, while extending the range of applicability of marine vibrator acquisition.

By way of example, the computer system 40 may process the seismic data acquired via a common-shot gather and a common-receiver gather together in a higher-dimensional "source-receiver space." By working in this higher-dimensional space (i.e., source-receiver space), the computer system 40 may compute a cost function (e.g., slowness spectrum) may be computed as a 2-dimensional or higher-dimensional cost function, rather than a 1-dimensional cost function. As a result, the cost function in higher-dimensions can be sparser, thereby making it easier to identify isolated events. In addition, the problems described above on both the source and receiver sides can be solved simultaneously.

Figure 10:
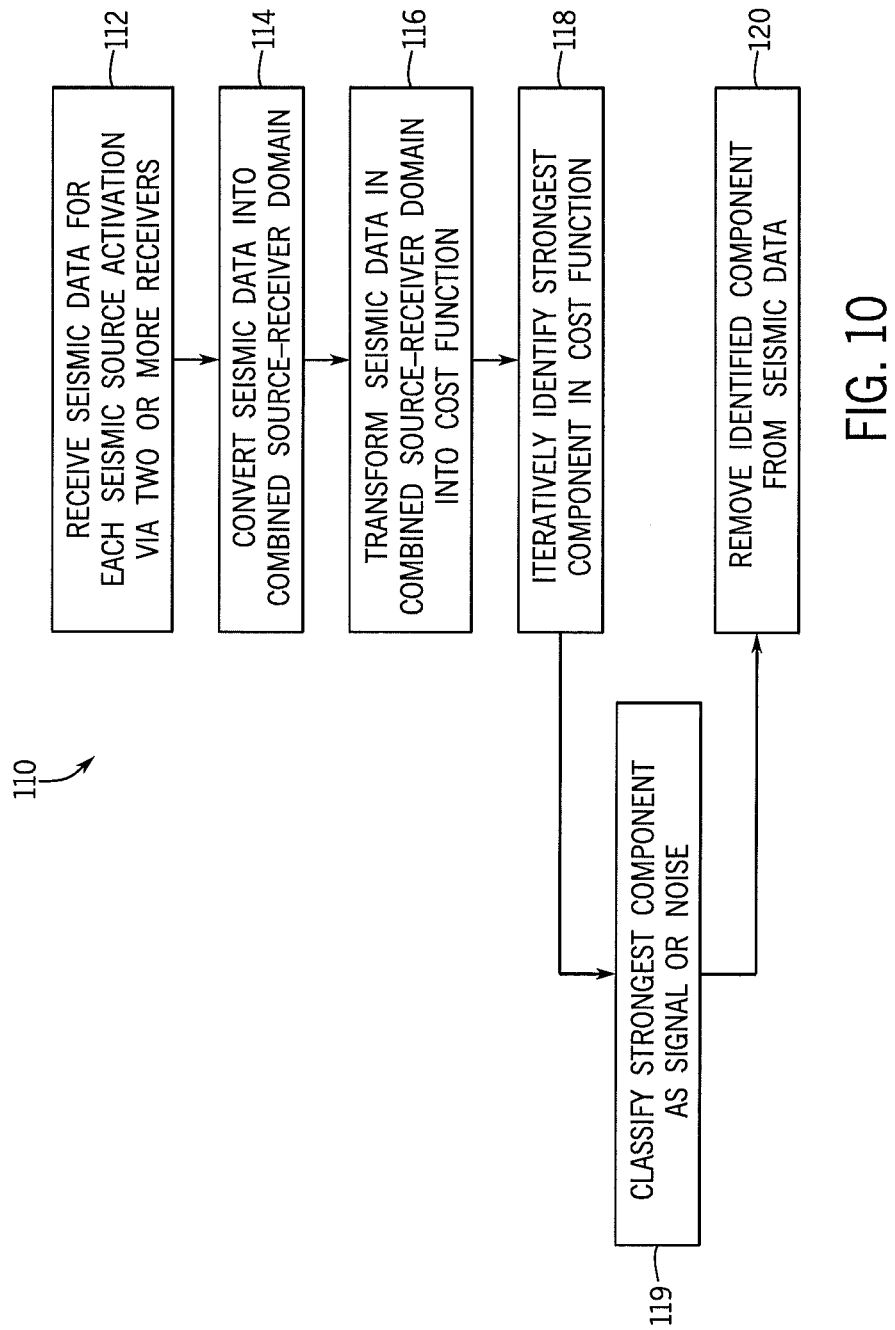
FIG. 10 illustrates a flow chart of a method for simultaneously reconstructing source side data and removing noise from seismic data acquired via the seismic marine survey arrangement of FIG. 1, in accordance with one or more embodiments of the present disclosure.

FIG. 10 illustrates an example method 110 for simultaneously processing seismic data acquired by two or more seismic receivers 26 in response to two or more seismic sources 62 at two or more locations emitting seismic wavefields that change directivity patterns from shot to shot. The following description of the method 110 is described as being performed by the computer system 40, but it should be noted that the method 110 may be performed by any suitable processing device and any number of receivers, sources, and locations, which numbers may be the same or different from each other. In addition, although the method 110 is described as being performed in a particular order, it should be understood that the method 110 may be performed in any suitable order.

Figure 11:
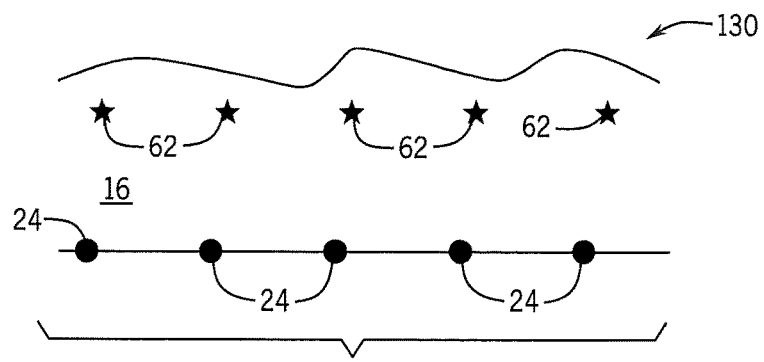
FIG. 11 illustrates a schematic survey geometry that may correspond to the seismic data processed according to the method of FIG. 10, in accordance with one or more embodiments of the present disclosure.

Referring now to FIG. 10, at block 112, the computer system 40 may receive seismic data (e.g., reflected seismic wavefields) acquired by two or more seismic receivers 26 in response to two or more seismic sources 62, such as the seismic vibrator array 14. The seismic vibrator array 14 may activate seismic sources 62 that emit wavefields at two or more locations. FIG. 11 illustrates an example survey geometry 130 that includes multiple seismic sources 62 and multiple seismic receivers 26. The survey geometry 130 of FIG. 10 combines the survey geometries depicted in FIGS. 3 and 7. In one or more embodiments, the seismic sources 62 may be activated such that the directivity pattern changes from shot to shot.

For each source activation, the resulting seismic wavefield may be recorded by two or more seismic receivers 26. Each of the seismic receiver 26 may record a pressure wavefield and a gradient of the pressure wavefield in at least one direction. As such, each seismic receiver 26 may include at least one pressure sensor and at least one pressure sensor to measure the gradient of a pressure wavefield in at least one direction. Although the following discussion may include pressure gradient sensors, it should be noted that the gradient on the seabed may also be estimated from other measurements, for example, by taking the finite-difference of two closely located pressure sensors.

Figure 12:
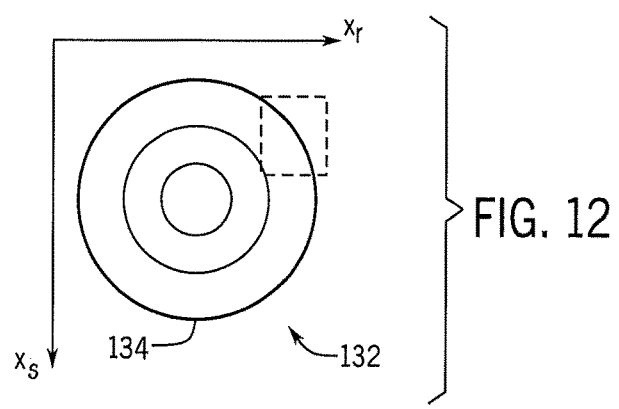
FIG. 12 illustrates a time slice of seismic wavefields acquired via the seismic marine survey arrangement of FIG. 1, in accordance with one or more embodiments of the present disclosure.

After receiving the seismic data, at block 114, the computer system 40 may convert the seismic data into a combined-source receiver domain. FIG. 12 illustrates an example time slice 132 through the combined source-receiver space. As shown in FIG. 12, one axis corresponds to source position ($x_s$) and the other axis corresponds to the receiver position ($x_r$). In the combined source-receiver domain, the different arrivals may appear as three-dimensional waveforms or as two-dimensional waveforms in a single time slice. For example, coherent noise 134 of FIG. 12 corresponds to the same noise component 74 illustrated in FIG. 4. However, by working in this higher-dimensional space, as mentioned above, the cost function may be computed as a two-dimensional or higher-dimensional cost function, rather than a one-dimensional cost function only.

Figure 13:
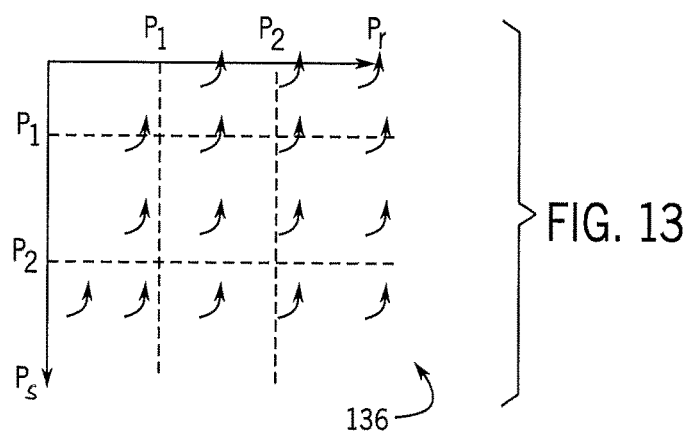
FIG. 13 illustrates a diagram of a unified source-receiver cost function that may be associated with the time slice of seismic wavefields of FIG. 12, in accordance with one or more embodiments of the present disclosure.

With this in mind, at block 116, the computer system 40 may transform the seismic data in the combined source-receiver domain into a cost function (e.g., slowness transform). By way of example, FIG. 13 illustrates a cost function 136 that is generated by transforming the seismic data in the combined source-receiver domain into a unified source-receiver cost function according to a slowness transform. The cost function 136 includes axes that correspond to the receiver slowness (e.g., $p_r$) and the source slowness (e.g., $p_s$).

At block 118, the computer system 40 may iteratively identify the strongest (e.g., having highest peak, amplitude, or the like) component(s) in the cost function. As discussed above, since the cost function in higher-dimensions is more sparse as compared to the cost function in lower dimensions, the computer system 40 may more easily identify isolated events that correspond to coherent noise more easily. That is, the isolated events that do not correspond to the reflected seismic wavefields may be more identifiable as being disparate from the reflected seismic wavefields.

After identifying the strongest component(s) of the cost function, at block 119, the computer system 40 may classify each identified component as a signal component of the seismic data or as a noise component of the seismic data. The computer system 40 may classify the identified component based on whether the associated slowness of the strongest component lies within the expected slowness range for signal or not.

If the identified component is noise, the computer system 40 may remove the noise component from input data and add the noise component to a noise output. Conversely, if the identified component is part of the signal, the computer system 40 may remove the signal component from input data and add the signal component to a signal output. That is, at block 120, the computer system 40 may remove the identified component from the seismic data received at block 112. In some embodiments, the computer system 40, at each iteration performed during the block 118, may model the desired output (e.g., signal component or noise component) based on the strongest component. The computer system 40 may then subtract the identified noise component from the input seismic data. As a result, the source sampling of the modeled signal component corresponds to a dense grid of seismic sources 62 recorded by a single seismic receiver 26, as illustrated in FIG. 14.

Figure 14:
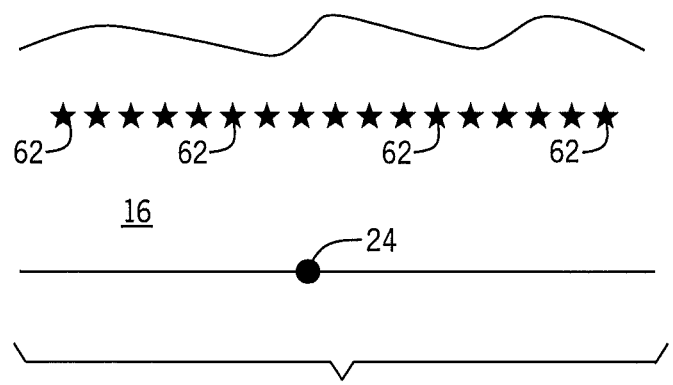
FIG. 14 illustrates a schematic survey geometry that may correspond to interpolated seismic data determined according to the method of FIG. 10, in accordance with one or more embodiments of the present disclosure.

In embodiments, the computer system 40 may reconstruct the seismic data based on source points that correspond to a dense grid, as illustrated in FIG. 14, using a matching pursuit method or the like. The matching pursuit method may involve transforming data into a cost function (transform domain) using a chosen basis function (e.g., linear basis functions), iteratively selecting the strongest (e.g., largest) component in the transform domain, computing an amplitude corresponding to that component, computing and updating the contribution to the output for that component, and subtracting the component from the input data. When the strongest (e.g., largest) component has a slowness that is inside the region defined as containing a signal, the computer system 40 may classify the component as part of the desired signal and add the component to a desired output signal model. Conversely, when the strongest (e.g., largest) component has a slowness that is outside the region defined as containing a signal, the computer system 40 may classify the component as noise and add the component to a desired output noise model.

Figure 15:
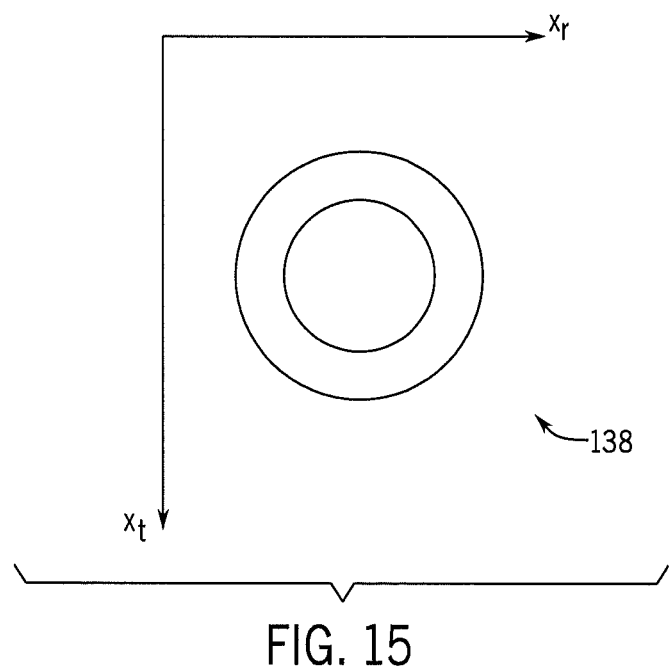
FIG. 15 illustrates a time slice of seismic wavefields acquired via the seismic marine survey arrangement of FIG. 1 and processed to remove noise according to the method of FIG. 10, in accordance with one or more embodiments of the present disclosure.

After identifying the noise components, the computer system 40 may remove the noise components from the input seismic data, and the resulting seismic data may not include the coherent noise 134 (e.g., Scholte wave) previously included in the input seismic data. For example, FIG. 15 illustrates a time slice 138 similar to the time slice 132 of FIG. 12 with the coherent noise 134 removed in light of the processing described with respect to the method 110. The resulting seismic data is achieved by removing the slowly propagating coherent noise that occurs during source-side reconstruction, as discussed above. That is, in the combined source-receiver domain, the removal of coherent noise can also be applied to the seismic sources. It should be noted that although the coherent noise removed from the seismic data is described as being related to a slowness property, in other embodiments, the computer system 40 may choose any desired slowness limitation in the combined cost function.

In certain embodiments (e.g., see FIG. 10, block 119), when iteratively selecting the strongest (e.g., largest) component in the transform domain (e.g., slowness transform), the computer system 40 may determine whether a slowness of the identified component lies within the region specified as belonging to a desired signal, compute a contribution of the desired signal for the desired densely sampled sources and adding to the output (e.g., adding the solution for the current iteration to the solutions from the previous iteration), compute a contribution of the desired signal to the input data, and subtract the contribution of the desired signal from the input seismic data. Alternatively, if the slowness lies outside of the region specified as belonging to a desired signal, the computer system 40 may compute a contribution of the noise component to the input seismic data, subtract the noise component from the input seismic data, and generate a "noise output" signal based on the contribution of the noise component. It should be noted that input data for the above process corresponds the raw seismic data or a selected window of raw seismic data, and contribution of the desired signal refers to the "matched" portion of the input data at the current iteration.

By using the combined source-receiver domain, the computer system 40 may produce the same type of output as the two separate source and receiver methods described above, but in a single processing step. In this way, the embodiments described herein may prevent errors from one step from affecting the other, improving the quality of results, as the data become sparser in higher dimensions (e.g., wavefield components are more easily distinguished), and allowing slowness limitations to be applied simultaneously on both the source and receiver side. In addition, seismic receivers 26 in OBC and OBN acquisitions may include more space or distance therebetween, thereby allowing seismic surveys to be conducted using fewer sensing and computing resources.

Figure 16:
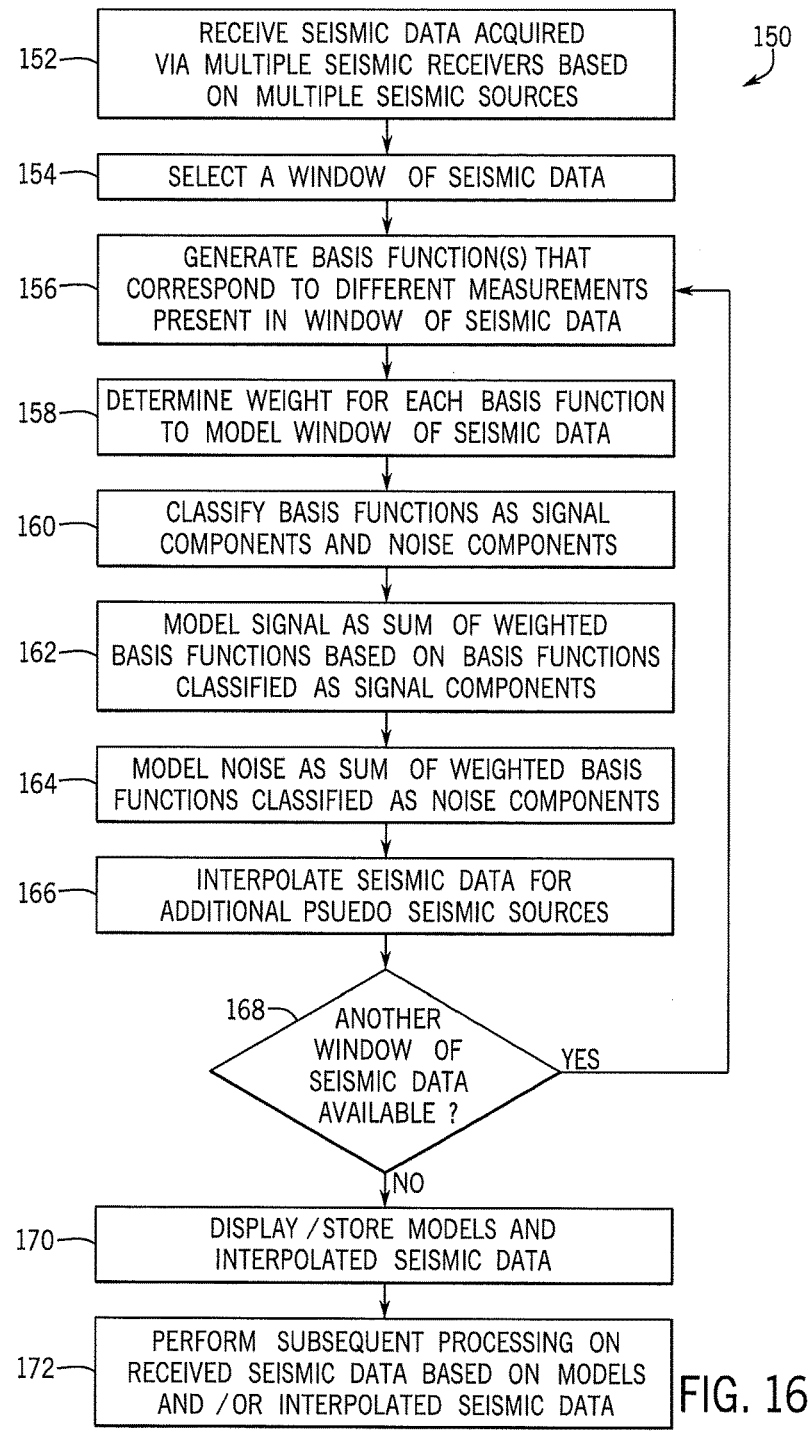
FIG. 16 illustrates a flow chart of a method for simultaneously reconstructing source side data and removing noise from seismic data acquired via the seismic marine survey arrangement of FIG. 1, in accordance with one or more embodiments of the present disclosure.

Keeping the foregoing in mind, FIG. 16 illustrates another method 150 for simultaneously reconstructing source side data and removing noise from seismic data acquired via the seismic marine survey arrangement of FIG. 1. The following description of the method 150 will be discussed as being performed by the computer system 40, but it should be understood that (like the other methods of the present disclosure) the method 150 may be performed by any suitable processing device. In addition, although the method 150 is described as being performed in a particular order, it should be noted that (like the other methods of the present disclosure) the method 150 may be performed in any suitable order.

Referring now to FIG. 16, at block 152, the computer system 40 may receive seismic data, as discussed above with reference to block 112 of FIG. 10. At block 154, the computer system may select a window or portion of the received seismic data. The portion of seismic data may include two or more time samples from the reflected seismic wavefields from at least two of the activated seismic sources 62 and at least two of the seismic receivers 26.

At block 156, the computer system 40 may generate one or more basis functions suitable to describe the pressure measurements and pressure gradient measurements provided in the portion of the seismic data for each seismic source 62 that contributed to the data provided in the window of seismic data selected at block 154. The basis functions may include or be any suitable basis function that characterizes noise components, signal components, and the like in a variety of domains (e.g., slowness). For example, the basis functions may be in the time (e.g., tau-p) domain, may correspond to parabolic or hyperbolic events, may correspond to curvelets, wavelets, or any other function that may describe and/or decompose seismic data.

After generating the basis functions, the computer system 40 may determine a weight for each basis function to model a portion of the seismic data that corresponds to the window of seismic data selected at block 154. In embodiments, the weight for each basis function may correspond to the amplitude of the identified component (e.g., peak/strongest).

At block 160, the computer system 40 may identify criteria to classify the generated basis functions as signal components or noise components. The criteria may include a determination as to whether the identified slowness, as described above, is within an expected range of the signal. The expected range of the signal may correspond to user defined range, ranges that typically include signals, and the like.

After the basis functions are classified, at block 162, the computer system 40 may model a signal that corresponds to the desired seismic data output as a sum of the weighted basis functions classified as signal components. In the same manner, at block 164, the computer system 40 may model the noise component as a sum of weighted basis functions classified as noise components.

After modelling the signal component and the noise component of the received seismic data, at block 166, the computer system 40 may interpolate the signal components for additional pseudo seismic sources at additional pseudo source locations (e.g., source reconstruction). That is, the computer system 40 may model signal components using additional basis functions that correspond to source locations where there was not a physical source.

At block 168, the computer system 40 may determine whether another window of seismic data is available. Alternatively, the computer system 40 may determine whether additional analyses on other portions of the seismic data are desired to be performed. If another window of seismic data is available for analysis, the computer system 40 may return to block 156 and perform the method 150 for the next window of seismic data. If, however, another window of seismic data is not available for analysis, the computer system 40 may proceed to block 170 and display the modelled signal component, the modelled noise component, the interpolated seismic data, and the like.

In addition, the data generated by the method 150 may be stored in the database 52 or another suitable storage device, such that the data may be analyzed to identify locations of hydrocarbon deposits and the like. For example, at block 172, the computer system 40 may perform subsequent processing on the data generated by the method 150 to identify the hydrocarbon locations or other features of interest. The identified locations may then be explored and operations to extract the deposits may occur.

By employing the presently disclosed embodiments, the computer system 40 may more efficiently process seismic data acquired via ocean bottom node or cable systems, including for 4-dimensional or time-lapse applications. As described above, the input data for the processing operations described above may include raw acquired seismic data acquired with a marine vibrator source (e.g., where the marine vibrator emits alternating directivity patterns) and sea-bed sensors (e.g., 4C, 4C with additional gradients of one or more of the four components). The output may include source data on a dense grid with source-related acquisition effects removed, and the receiver data on the same grid as the input data was acquired, but with coherent noise removed. As a result, coherent noise attenuation can be carried out within the same process as the source-side reconstruction. In this way, the applicability of the marine vibrator ocean bottom node acquisition may be extendable to shallower water without the need to perform additional processing either before or after the source reconstruction step.

Moreover, the embodiments described above allow for the sampling of the seabed receivers to increase in distance (e.g., from 25 m to 100 m) without compromising the ability to attenuate coherent noise. Thus, the seismic data processing involves less time to record the source data, while using fewer sensors to cover the same receiver area.

Wavefield Separation During Source-Side Reconstruction

In addition to simultaneously reconstructing seismic data on the source side and de-noising the seismic data on the receiver side as described above, the computer system 40 may also process the acquired seismic data to separate components of the seismic data. For example, up-going wavefields and down-going wavefields may be separated from the acquired seismic data, pressure wavefields and shear wavefields may be separated from the acquired seismic data, multiple free up-going wavefields may be separated from the acquired seismic data, and the like.

Before discussing the various embodiments for processing the seismic data to separate these components, it may be useful to note that in ocean bottom node (OBN) seismic surveys, due to the distance between each deployed node (e.g., seismic receiver 26), the reflected seismic data acquired at each node may be processed individually. That is, common-source gather-type processing may not be used. Rather, seismic sources 62 may be distributed on a dense grid (e.g., either in acquisition, or through interpolation/ reconstruction of sparser acquisition grids), such that the data acquired by each node in the OBN survey may be processed accurately. Using some assumptions, the presence of the source grid may enable the data to be processed using 3-dimensional data processing algorithms. For example, using this dense grid of shots, the computer system 40 may analyze the acquired seismic data using wavefield separation and de-multiple processes, prior to imaging.

To process the seismic data acquired at each individual node, the computer system 40 may receive seismic data from seismic sensors 24 that may include 4-component (4C) sensors. The 4C sensors may measure pressure and three components of particle velocity (e.g., x-direction velocity, y-direction velocity, z-direction velocity). The properties (e.g., recording components) measured by the seismic receivers 26 may allow some local data processing steps to be applied, despite that the seismic data is acquired from a single location. For example, the weighted combination of pressure and vertical particle velocity may allow the measured pressure wavefield to be separated into the up-going and down-going wavefields. In addition, the weighted combination of all four recording components can also allow the data to be separated into pressure (P) wave and shear (S) wave arrivals.

With the foregoing in mind, the presently disclosed embodiments may enable the computer system 40 to process the seismic data acquired by the OBN-type seismic survey by incorporating the receiver-side processing steps during the part of the processing flow that solves the problems on the source-side. This is possible by recognizing that the assumptions involved (e.g., the sea-bed is flat) in performing up-down separation and de-multiple processes by up-down deconvolution may involve decomposing the acquired seismic wavefield into slowness or wavenumber wavefield components on the source-side. These wavenumber wavefield components correspond to the source wavefields used to perform source-side reconstruction. That is, instead of performing seismic data processing using multi-channel reconstruction, which employs multiple channels on the source-side to assist in the reconstruction of source points (or conversely on the receiver-side to assist in the reconstruction of receiver points), the presently disclosed embodiments may separate components of acquired seismic data using data acquired by at least one seismic receiver 26. Additional details with regard to separating components of acquired seismic data while attenuating noise components due to the seismic sources 62 will be discussed below with reference to FIGS. 17-19.

Figure 17:
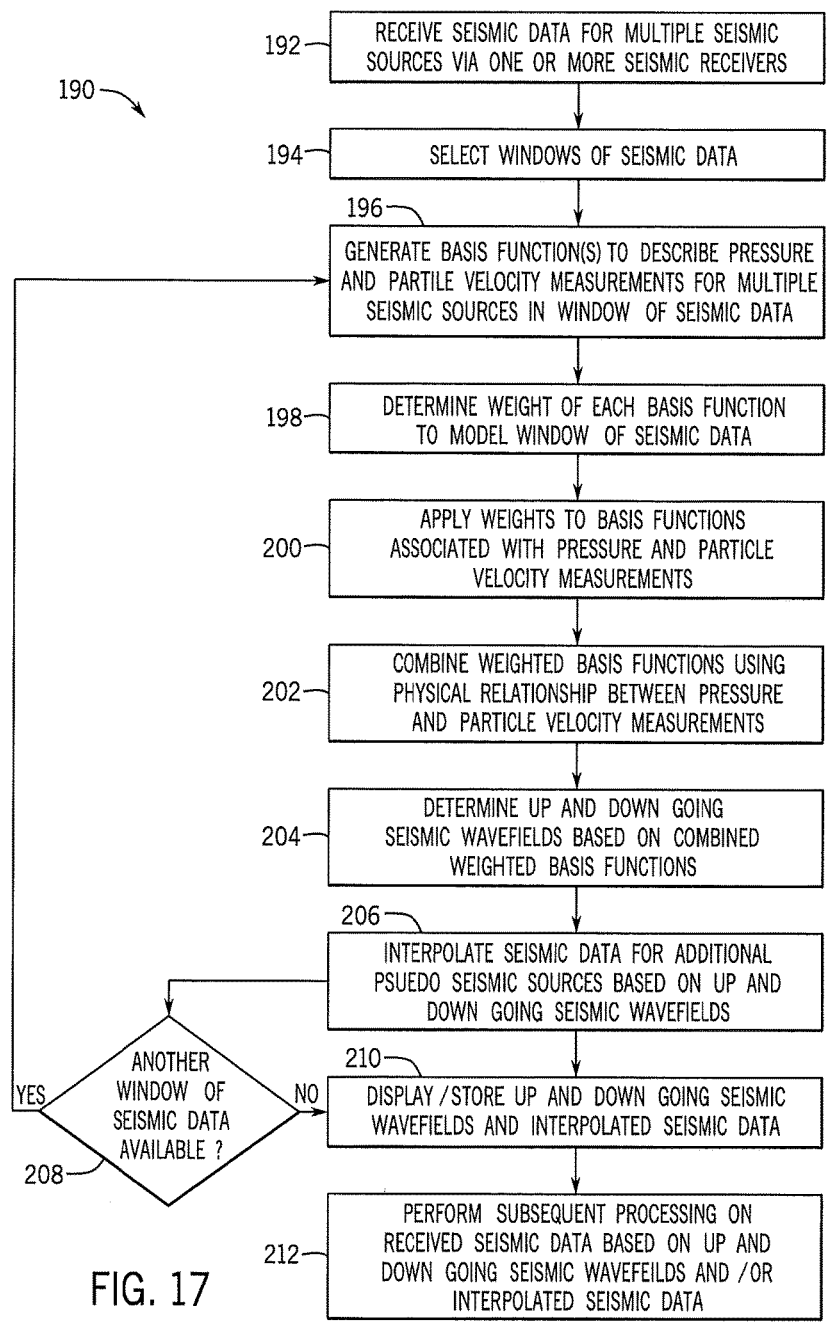
FIG. 17 illustrates a flow chart of a method for separating components from seismic data related to pressure and particle velocity measurements acquired via the seismic marine survey arrangement of FIG. 1, in accordance with one or more embodiments of the present disclosure.

By way of example, FIG. 17 illustrates a flow chart of a method 190 for determining up-going and down-going seismic wavefields in the seismic data acquired by one or more seismic receivers 26. Although the method 190 is described below in a particular order, it should be noted that the method 190 may be performed in any suitable order. In addition, the method 190 will be described as being performed by the computer system 40, but any suitable computing device may perform the following method.

At block 192, the computer system 40 may receive seismic data acquired by one or more seismic receivers 26 in response to seismic sources 62 emitting wavefields from two or more source locations. In some embodiments, the directivity pattern of the emitted wavefields may change from shot to shot. In ocean bottom node acquisition, multiple wavefield components may be acquired via the seismic data and the seismic receivers 26. The wavefield components may include pressure and three-components of particle velocity. By way of example, for each source activation, the one or more seismic receivers 26 may record the reflected seismic wavefield, which may include the pressure wavefield and the vertical particle velocity wavefield.

In the frequency-wavenumber domain, the pressure, P(ω, k), and vertical particle velocity, $V_z(\omega, k)$, recorded in the water layer can be related by:

$$V_z(\omega, k) = \frac{k_x}{\omega\rho} P(\omega, k). \tag{1}$$

where k is the horizontal wavenumber vector ($k=k_x$ for 2D acquisition, and $k=[k_x, k_y]$ for 3D acquisition), ω is the angular frequency, ρ is the water density, and k is the vertical wavenumber wavefield component. The directionality of the vertical particle velocity allows the two recording components to be combined to separate the data into up- and down-going wavefields:

$$P^{up}(\omega, k) = \frac{1}{2}\left[P(\omega, k) + a(\omega)\frac{\omega\rho}{k_z}V_z(\omega, k)\right] \tag{2}$$

$$P^{down}(\omega, k) = \frac{1}{2}\left[P(\omega, k) - a(\omega)\frac{\omega\rho}{k_z}V_z(\omega, k)\right] \tag{3}$$

This separation may be performed in the frequency-wavenumber or frequency-slowness domain as the scaling factor $$\frac{\omega\rho}{k_z}$$

is dependent on wavenumber and frequency (or slowness). The factor α(ω) is a calibration factor that accounts for differences in the response of the pressure and particle velocity sensors. In some embodiments, the calibration factor may be determined from the acquired seismic data by, in one example, identifying part of the seismic data where only upgoing waves will be present (e.g., between the first arrival at the seabed and the first sea-surface reflection). In this case, the down-going wavefields should be exactly zero, so equations (2) and (3) can be solved for the calibration factor. In the embodiments described herein, however, the separation of up-going waves and down-going waves may be determined while performing the source-side reconstruction data processing operations.

After receiving the seismic data, at block 194, the computer system 40 may select a window or portion of the seismic data. As mentioned above with regard to FIG. 16, the window of the seismic data may include two or more time samples from the seismic data associated with at least two of the activated sources as received by one of the seismic receivers 26.

After receiving the selection of the window of seismic data, the computer system may, at block 196, generate one or more basis functions to describe the pressure and particle velocity measurements for each seismic source 62 contributing to the data present in the window of seismic data. In certain embodiments, the basis function may be defined as follows:

$$b=\exp(ik_n \cdot x) \tag{4}$$

where x is a vector describing spatial coordinates of the seismic sources 24 within the current analysis window, and $k_n$ is the wavenumber vector corresponding to the chosen wavefield component at iteration n.

At block 198, the computer system 40 may determine a weight for each basis function to model the window of seismic data, as described above with respect to block 158.

After determining the weights for the basis functions, at block 200, the computer system 40 may apply the weights to the basis functions associated with the pressure measurements and the particle velocity measurements. For example, if $A_P$ and $A_Z$ correspond to the determined weights (e.g., output amplitudes) determined for the pressure and particle velocity data, respectively, the weights may be applied to the respective basis functions at the nth iteration as:

$$P_n(\omega,k) = A_P \exp(ik_n x) \quad (5)$$

$$V_{zn}(\omega,k) = A_Z \exp(ik_n x) \quad (6)$$

At block 202, the computer system 40 may combine the weighted basis functions using the physical relationship between the pressure measurements and the particle velocity measurements. For example, the weighted pressure measurement and particle velocity measurement described above in equations (5) and (6) may be combined with equations (2) and (3) to determine the up-going and down-going wavefields corresponding to the wavefield component at the nth iteration according to:

$$P_n^{up}(\omega, k) = \frac{1}{2}\left[P_n(\omega, k) + a(\omega)\frac{\omega\rho}{k_z}V_{zn}(\omega, k)\right] \quad (7)$$

$$P_n^{down}(\omega, k) = \frac{1}{2}\left[P_n(\omega, k) - a(\omega)\frac{\omega\rho}{k_z}V_{zn}(\omega, k)\right] \quad (8)$$

At block 204, the computer system 40 may determine the separated up-going and down-going seismic wavefields from the seismic data according to equations (7) and (8). At block 206, the computer system 40 may interpolate seismic data for additional pseudo seismic sources based on the determined up-going and down-going wavefields. That is, the output dataset may be modelled using additional basis functions corresponding to source locations where there was not a physical seismic source 62.

After interpolating the seismic data, at block 208, the computer system 40 may determine whether another window of seismic data is available or desired to be processed. If another window of seismic data is available, the computer system 40 may return to block 196 and perform the method 190 again with respect to the new window of seismic data. Alternatively, if another window of seismic data is not available, the computer system 40 may proceed to block 210 and display the separated components of the seismic data and/or the interpolated data. In addition, the computer system may store the data determined via the method 190 in the database 52 or any other suitable storage component. The computer system 40 may then perform subsequent analysis of the separated components of the seismic data and/or the interpolated data to identify locations of hydrocarbon deposits or the like.

Figure 18:
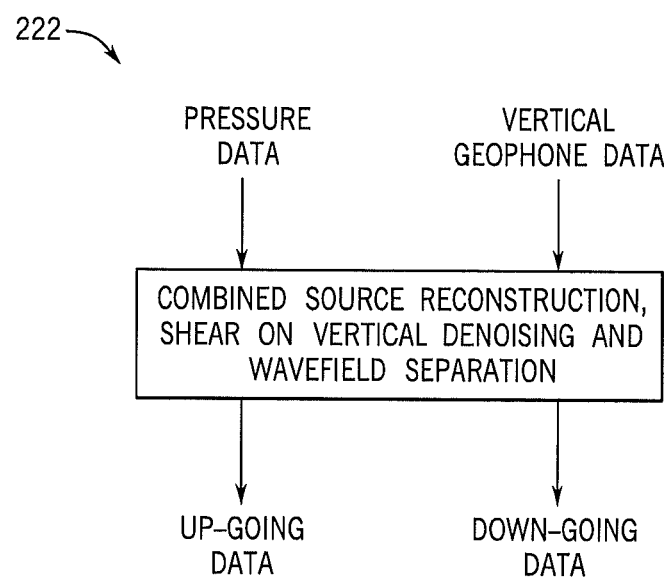
FIG. 18 illustrates a block diagram of a data flow chart for separating up-going and down-going seismic wavefields from seismic data related to pressure and particle velocity measurements acquired via the seismic marine survey arrangement of FIG. 1, in accordance with one or more embodiments of the present disclosure.

By performing the processing operation of the method 190, the computer system 40 may determine the up-going and down-going wavefields as part of the source reconstruction algorithm, thereby forgoing i.e. avoiding the need for a separate processing step. That is, since the seismic data is decomposed into plane-wave (or wavenumber) wavefield components during the source-side reconstruction, the wavefield separation results are achieved with minimal additional computational cost. A block diagram of the inputs and outputs of the method 190 is illustrated in FIG. 18 for reference.

In the foregoing discussion of the method 190, the seismic data may include a combination of pressure and vertical particle velocity measurements, but it should be noted that it is also possible to use other recording components to do different types of wavefield processing/separation. That is, the presently disclosed embodiments with regard to the method 190, as well as the other systems and methods of the present disclosure, should not be limited to just these two recording components.

Figure 19:
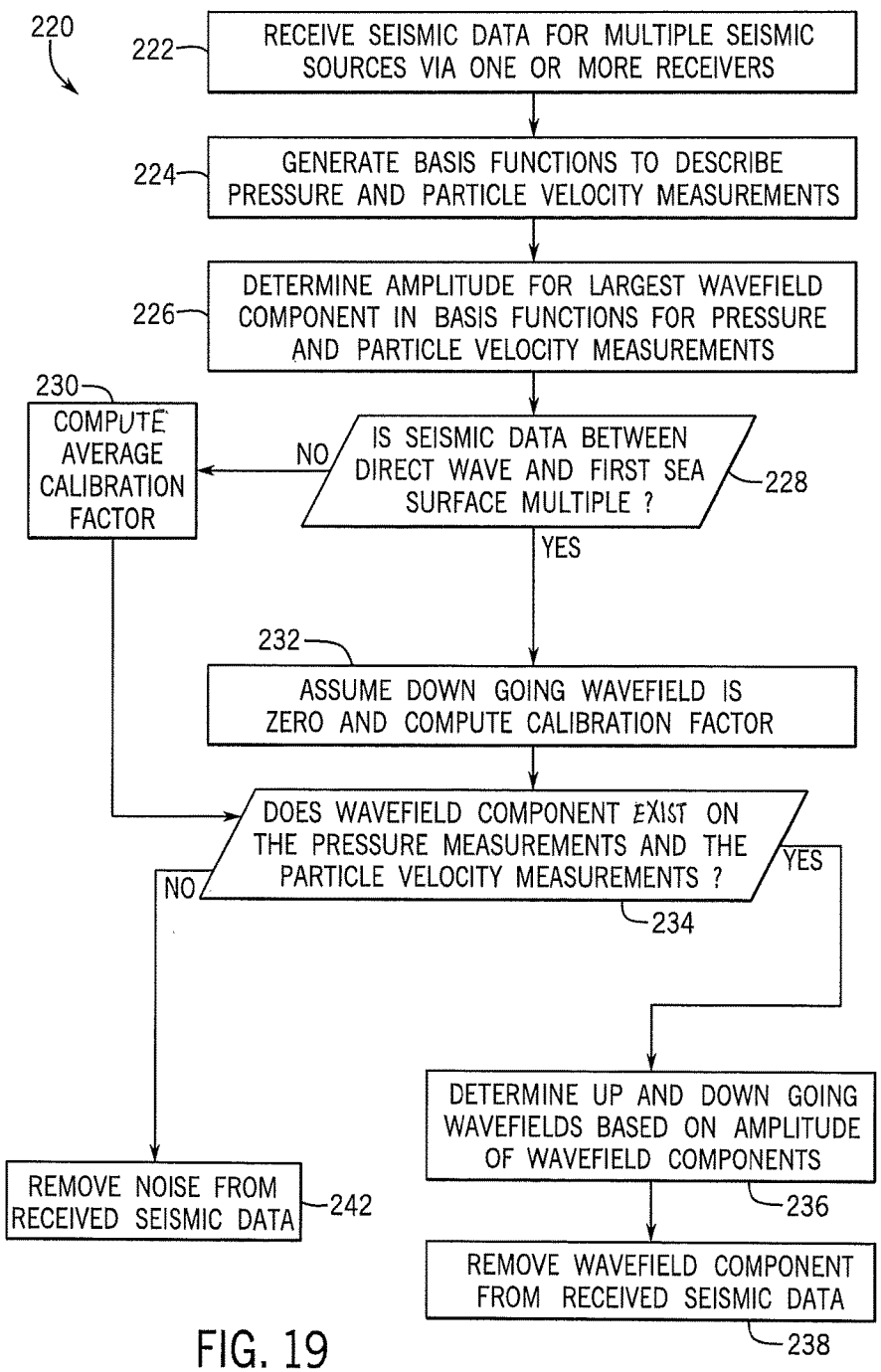
FIG. 19 illustrates another flow chart of a method for separating components from seismic data related to pressure and particle velocity measurements acquired via the seismic marine survey arrangement of FIG. 1, in accordance with one or more embodiments of the present disclosure.

With the foregoing in mind, FIG. 19 illustrates another method 220 for determining up-going and down-going seismic wavefields in the seismic data acquired by one or more seismic receivers 26. Although the method 220 is described below in a particular order, it should be noted that the method 220 may be performed in any suitable order. In addition, the method 220 will be described as being performed by the computer system 40, but any suitable computing device may perform the following method.

Referring now to FIG. 19, the blocks 222 and 224 may correspond to the blocks 192 and 196, respectively, of FIG. 17. At block 226, the computer system 40 may determine an amplitude for the strongest (e.g., largest) wavefield component in the basis functions for the pressure measurement and the particle velocity measurement. That is, in some embodiments, for a given frequency, the computer system 40 may use a specified basis function library to identify the strongest (e.g., largest) wavefield component in the data across both the pressure and particle velocity measurements. The computer system 40 may then compute the corresponding amplitude of the strongest (e.g., largest) wavefield component for both measurements.

Generally, the source-side reconstruction operation may include determining a wavefield made up of a sum of weighted plane-wave basis functions, according to the matching pursuit method or the like. During this operation, the computer system 40 may identify the strongest wavenumber (or slowness) wavefield component at each frequency, and the amplitude of that wavefield component may be determined based on a description of the seismic data that may include without limitation the source ghost, source motion, source signature effects, and the like. The computer system 40 may then identify the basis function corresponding to the strongest wavenumber, scale the identified basis function by the determined amplitude, and add the scaled basis function to the output wavefield.

If there will be two datasets that the seismic data is matched with—the pressure dataset and the particle velocity dataset—in some embodiments, the computer system 40 may determine an amplitude of a wavefield component for each strongest wavefield component in both the pressure and the particle velocity datasets.

Referring back to FIG. 19, at block 228, the computer system 40 may determine whether the acquired seismic data falls between the direct wave and the first sea surface multiple. If the seismic data does fall between the direct wave and the first sea surface multiple, the computer system 40 may proceed to block 232 and assume that the down-going wavefield in the seismic data is zero and compute the calibration factor $\alpha(\omega)$ accordingly.

If, however, the seismic data is after the first sea surface multiple, the computer system 40 may proceed to block 230 and compute the average of the calibration factors $\alpha(\omega)$. In certain embodiments, calibration factors can be computed for each seismic receiver 26 in turn, or computed as a sum of the contributions from neighboring seismic receivers 26. After determining the calibration factor $\alpha(\omega)$, the computer system 40 may proceed to block 234 and determine whether the identified wavefield component exists on the pressure measurement and the particle velocity measurement based on the calibration factor $\alpha(\omega)$. That is, the computer system 40 may use the determined calibration factor $\alpha(\omega)$ and the corresponding determined amplitudes to determine whether the wavefield component exists on both basis functions that describe the pressure and particle velocity measurements using equation (1) mentioned above.

If the computer system 40 determines that the wavefield component exists on both measurements, the computer system 40 may proceed to block 236. At block 236, the computer system 40 may use the determined amplitudes to compute the equivalent up-going and down-going wavefields of the seismic data. The computer system 40 may then, at block 238, remove the identified wavefield component from the seismic data received at block 222.

If, however, the computer system 40 determines that the wavefield component does not exist on both measurements, the computer system 40 may proceed to block 242. At block 242, the computer system 40 may remove the identified wavefield component from the seismic data received at block 222.

In certain embodiments, the method 220 may be iteratively repeated for the next strongest (e.g., largest) wavefield component of the basis functions that describe the pressure and velocity measurements of the seismic data.

In addition to the foregoing discussions related to processing seismic data, while separating the data into up-going and down-going pressure fields, the computer system 40 may also compute a horizontal gradient of the pressure by multiplying the reconstructed basis function by the optimum wavenumber. That is, using the relationships described in equations (9) and (10) below, the computer system 40 may determine the P-wave contributions on the horizontal and vertical components $(v_x^P, v_x^P)$ within the same workflow described above.

$$v_x^P(\omega, p_x) = a(\omega)\frac{-k}{\omega\rho}P(\omega, p_x) + \frac{2c_s^2 k^2}{\omega^2}v_x(\omega, p_x) \quad (9)$$

$$v_z^P(\omega, p_x) = \left(1 - \frac{2c_s^2 k^2}{\omega^2}\right)v_z(\omega, p_x) \quad (10)$$

where $c_S$ is the shear wave velocity at the seabed.

The P-wave contributions result from summing the up-going and down-going wavefields on the horizontal and vertical components. To determine the calibration factor $\alpha(\omega)$, the computer system 40 may identifying a range of times where there are only up-going wavefields in the seismic data. In some embodiments, the computer system 40 may split the source-side reconstruction operation into two parts. The first part may perform the source-side reconstruction operation in the region where there are only up-going wavefields, and the second part may include performing the source-side reconstruction operation in the region where there are both up-going and down-going wavefields.

In some embodiments, the computer system 40 may determine the calibration factor $\alpha(\omega)$ for the second part from the first part. In other embodiments, for each analysis window that should have only up-going wavefields, the computer system 40 may compute and store the values for the calibration factor $\alpha(\omega)$ at each iteration and use the average of this value across all iterations as the calibration factor $\alpha(\omega)$ for later windows where both up- and down-going wavefields are present. As a result, the computer system may compute the calibration factor $\alpha(\omega)$ "on the fly" during the source-side reconstruction operation.

In addition, prior to performing the up-down separation, in some embodiments, it may be useful to de-noise or filter certain noise-modes that may be present in the seismic data. An example of one of the noise-modes may include "shear on vertical" noise, which corresponds to leakage of shear energy onto the vertical component geophone. The computer system 40 may filter this noise node using data acquired from a horizontal component geophone as a noise reference for adaptive subtraction. In some embodiments, it may be possible to attempt to identify noise modes, such as the shear on vertical noise, that occur on one recording component (e.g., vertical particle velocity) and not on another recording component (e.g., pressure). For example, during source-side reconstruction operations, the computer system 40 may extract weights or amplitude values $A_P$ and $A_Z$ for a given slowness wavefield component. If the calibration factor $\alpha(\omega)$ is known, the absolute values of $A_P$ and $A_Z$ should be predictable from one another, since all terms in equation (1) are known. Thus, if equation (1) does not hold (within some defined threshold), the computer system 40 may identify the identified wavefield component can be identified as noise occurring on either the pressure or particle velocity recording component. The computer system 40 may then review or analyze the two recording components independently to identify which recording component includes the noise. As such, the computer system 40 may identify receiver-related noise while performing a source-side reconstruction operation.

By separating the wavefields in the seismic data during source-side reconstruction, certain embodiments described herein save both used disk-space (e.g., memory, storage) and processing effort. As a result, the time related to processing seismic data and identifying the locations of hydrocarbon deposits may be reduced. In addition, the improved processing methods of the present disclosure described herein may enable certain seismic data processing operations to be performed locally (e.g., onboard the recording and/or node recovery/harvesting vessel).

The embodiments described herein may include identifying noise that exists on one channel that does not exist on another. For example, horizontally propagating scattered waves in the water layer may not be recorded on the vertical geophone recording component, but will be recorded on the hydrophone. Indeed, shear wave leakage on the vertical geophone may not be recorded on a hydrophone. As such, provided that the seismic receivers 26 (e.g., sensors) are correctly calibrated, the amplitude of an event on one recording component may be predicted for another, and hence it may be possible to determine if an event picked during reconstruction is an event to be reconstructed or is noise to be discarded. As such, certain embodiments of the present disclosure may avoid removing the shear on vertical noise by adaptively subtracting the horizontal recording component data from the vertical recording component data. Instead, the presently disclosed techniques may enable identifying and suppressing noise during reconstruction which may be a more effective way to this part of the data while preserving storage space and processing power.

Seismic Receiver Designs

The foregoing processing techniques have been described as being performed with seismic receivers 26 having 4C sensors that may measure pressure and three components of particle velocity (e.g., x-direction velocity, y-direction velocity, z-direction velocity). In addition to the 4C sensors, the seismic receivers 26 may include at least one additional sensor that may be used to determine a gradient measurement. Gradient measurements have been suggested for land seismic to acquire a noise reference that can be adaptively subtracted from the vertical component of the wavefield (Edme et al., 2011) and to combine the gradient with the vertical component of the wavefield to attenuate spatially aliased noise by matching pursuit (El Allouche et al., 2015).

In some instances, the lateral gradients may be estimated by determining a difference between the vertical component of two adjacent geophones. Alternatively, gradients may also be approximated from two horizontal geophones placed at two different depth levels (Goujon et al., 2013).

For the marine seismic survey 10, the gradient of the pressure field may be measured using accelerometers. For example, pressure data and acceleration data may be combined to separate the pressure field in up-going and down-going waves using the matching pursuit approach described above. In some instances, a cluster of hydrophones and/or geophones placed in the water 16 may be used to record the pressure gradients. That is, the multicomponent sensor cluster may measure the gradients of the pressure field in three orthogonal directions by determining the difference between data acquired by two hydrophones placed at a distance from each other or by measuring the acceleration data in the water.

With the foregoing in mind, certain embodiments of the present disclosure may include one or more of various node designs for the seismic receiver 26 that may allow the recording of spatial gradients of the pressure along with a translational wavefield. By recording the gradients along with the translational wavefield, such embodiments enable a range of improved seismic data processing operations, such as coherent noise attenuation, wavefield reconstruction, and wavefield separation, as detailed above.

More specifically, aspects of the present disclosure are related to extending the seismic receivers 26 employed in an ocean-bottom node (OBN) that record four components of the reflected seismic wavefield (e.g., 3C particle velocity and pressure) at the seabed. The extension may include adding one or more hydrophones and/or geophones to measure the spatial gradients of pressure in the water 16 and the particle velocity gradients (or acceleration) at the water bottom 30 (e.g., seafloor or seabed). By adding the additional sensor(s) to measure these properties, the presently disclosed seismic receiver designs may acquire different data (e.g., particle velocity or acceleration) that may not correspond to spatial derivatives of the pressure field in the water 16 due to the seismic receiver's 26 being coupled to the water bottom 30 (e.g., seafloor or seabed). Indeed, the incorporation of the additional sensor(s) enable the computer system 40 to more effectively perform seismic data processing, such as up-down separation, P-S separation, wavefield reconstruction, and noise attenuation processing using the matching pursuit framework in a sparse receiver configuration.

Figure 20:
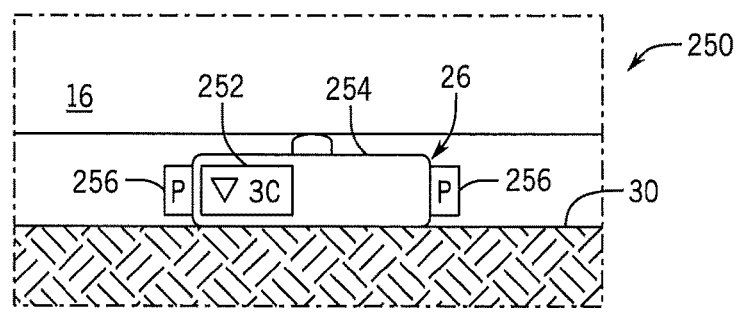
FIG. 20 illustrates a block diagram of an embodiment of a seismic receiver that may be used in the seismic marine survey arrangement of FIG. 1, in accordance with one or more embodiments of the present disclosure.

Keeping the foregoing in mind, FIGS. 20-24 illustrate various designs in which a seismic receiver 26 may incorporate different arrangements of sensors. Referring now to FIG. 20, a side view 250 of one embodiment of the seismic receiver 26 is illustrated. The seismic receiver 26 may include a 3C particle-velocity sensor 252 disposed within a housing 254 of the seismic receiver 26. In addition, the seismic receiver 26 of FIG. 20 may include a pressure sensor 256 disposed on each side of the seismic receiver 26. The two pressure sensors 256 may be used to determine the pressure gradient between sides. It should be noted that each or of the sensors described as being disposed within the housing 254 may be in fluid contact with the surrounding medium (e.g., water 16). In some instances, some of the sensors described herein may be enclosed within the housing 254. In certain embodiments, the node configuration described in FIG. 20 may be coupled to the seafloor.

Figure 21:
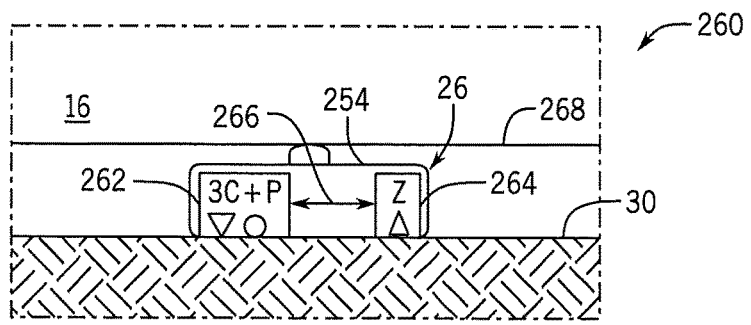
FIG. 21 illustrates a block diagram of a second embodiment of a seismic receiver that may be used in the seismic marine survey arrangement of FIG. 1, in accordance with one or more embodiments of the present disclosure.

Although the seismic receiver 26 of FIG. 20 may acquire pressure gradient data, in certain embodiments, it may be beneficial to include the additional sensors within the housing 254 of the seismic receiver 26. With this in mind, FIG. 21 illustrates a side view 260 of another design of the seismic receiver 26 that may be used in the marine seismic survey 10 described herein. In one embodiment, the seismic receiver 26 of FIG. 21 may include a 4C sensor 262 that measures the 3C particle velocity and pressure. The 4C sensor 262 may be disposed on one end or corner of the seismic receiver 26. In addition to the 4C sensor 262, the seismic receiver 26 may include a 1C particle velocity sensor 264 disposed on an opposite end of the seismic receiver 26 with respect to the 4C sensor 262. It should be noted that the sensors described herein are not limited to be disposed at certain ends or corners of the seismic receiver 26. Indeed, each of the designs of the seismic receivers 26 described below include sensors that are positioned, such that the sensors of a respective seismic receiver 26 include a certain distance (e.g. less than half a meter) between another one of the sensors therein. By way of example, in FIG. 21, the 4C sensor 262 may be disposed a distance (e.g., less than half of a meter) away from the 1C particle velocity sensor 264. The 1C particle velocity sensor 264 may measure the particle motion (e.g., velocity, acceleration) in one direction. This additional sensor may be a hydrophone and/or a geophone placed at a fixed distance 266 (e.g., less than half a meter) away from the 4C sensor 262. Both sensors may thus be located on the same node of an OBN receiver. The spatial gradients may be estimated by determining a difference between the data acquired by two hydrophones or geophones. The seismic receiver designs having one spatial gradient may be deployed on a rope 268 at a sparse spacing (e.g., greater than 50 m) and may record the gradient along the receiver line. The sensors that measure particle motion as described herein may include a geophone, an accelerometer, or the like.

Figure 22:
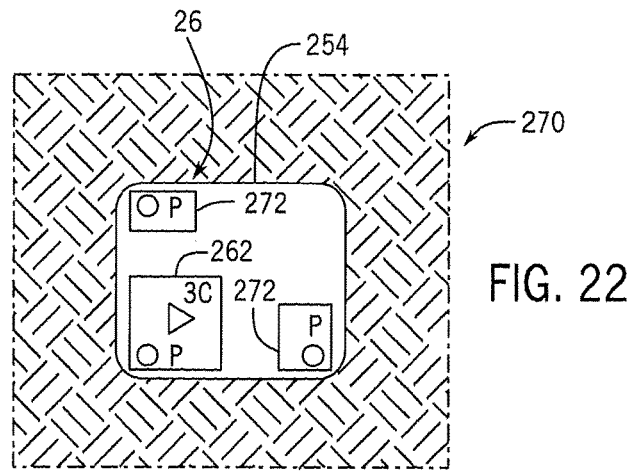
FIG. 22 illustrates a block diagram of a third embodiment of a seismic receiver that may be used in the seismic marine survey arrangement of FIG. 1, in accordance with one or more embodiments of the present disclosure.
Figure 23:
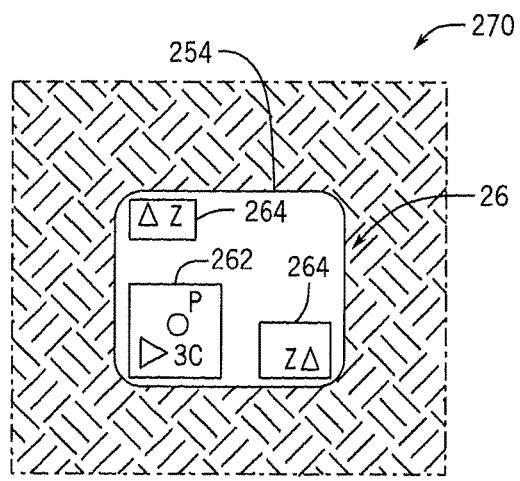
FIG. 23 illustrates a block diagram of a fourth embodiment of a seismic receiver that may be used in the seismic marine survey arrangement of FIG. 1, in accordance with one or more embodiments of the present disclosure.
Figure 24:
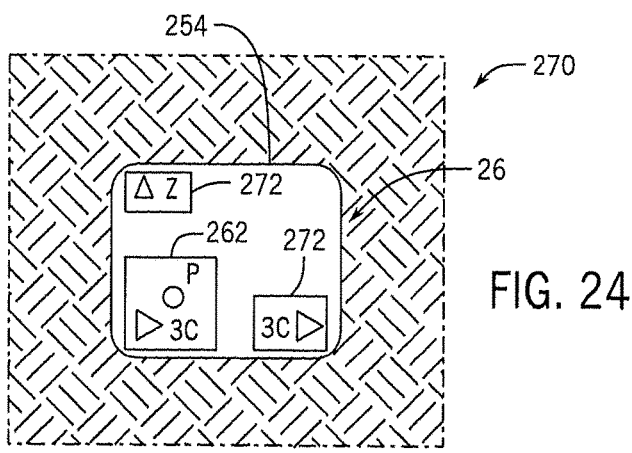
FIG. 24 illustrates a block diagram of a fifth embodiment of a seismic receiver that may be used in the seismic marine survey arrangement of FIG. 1, in accordance with one or more embodiments of the present disclosure.

In addition to seismic receivers 26 with one spatial gradient, FIGS. 22-24 illustrate sample seismic receiver designs with two spatial gradients. As such, additional sensors including hydrophones, geophones, and/or one to three component geophones may be enclosed within the housing 254 of the seismic receiver 26.

For example, FIG. 22 illustrates a top view 270 of a seismic receiver design that may include the 4C sensor 262 and two pressure sensors 272 disposed at two different corners of the housing 254 to provide two horizontal gradients. In the same manner, FIG. 23 illustrates a top view 280 of a seismic receiver design that may include the 4C sensor 262 and two 1C particle velocity sensors 264 disposed at two different corners of the housing 254 to provide two horizontal gradients. In another example, FIG. 24 illustrates a top view 290 of a seismic receiver design that may include the 4C sensor 262 and two 3C particle velocity sensors 272 disposed at two different corners of the housing 254 to provide two horizontal gradients.

FIGS. 22-24 thus illustrate examples of seismic receiver nodes with two spatial gradients that can be deployed as autonomous systems where the gradients are estimated in at least two orthogonal directions. It should be noted that nodes with pressure gradients may allow for the estimation of the horizontal accelerations (ax, ay) and particle velocities ($v_x$, $v_y$) in the water 16 using the equation of motion provided below:

$$a_x|_w = \partial_t v_x|_w = \frac{-1}{\rho_w}\partial_x P, \qquad (12)$$
$$a_y|_w = \partial_t v_y|_w = \frac{-1}{\rho_w}\partial_y P,$$

Where P corresponds to pressure and $\rho_w$ represents the water density.

With this in mind, nodes with particle velocity gradients may measure the spatial gradient in the seabed according to:

$$\partial_x v_z(\omega,p) = -j\omega p_x v_z,$$
$$\partial_y v_z(\omega,p) = -j\omega p_y v_x,$$
$$\partial_y v_x(\omega,p) = -j\omega p_y v_x,$$
$$\partial_x v_y(\omega,p) = -j\omega p_x v_y, \qquad (13)$$

where $p=(p_x, p_y, q)$ is the slowness vector.

Figure 25:
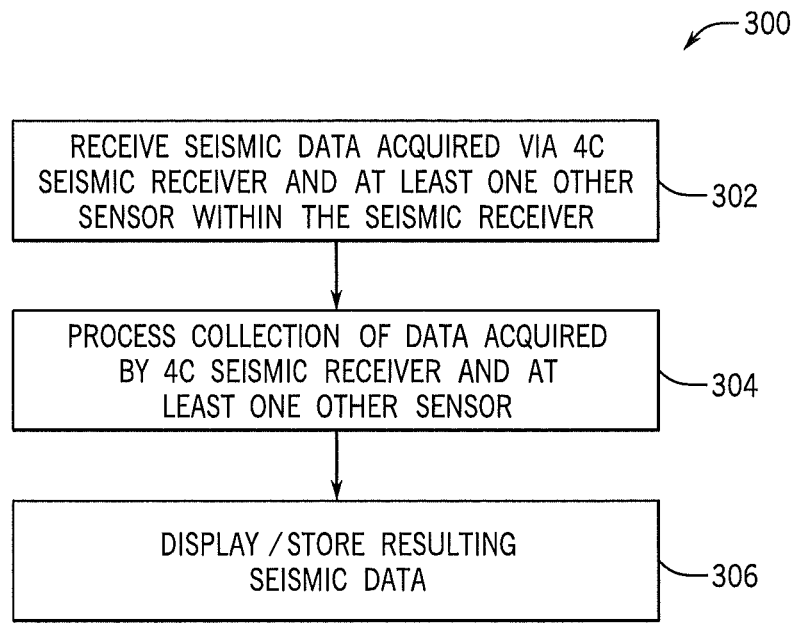
FIG. 25 illustrates a flow chart of a method for processing seismic data acquired via (for example) the seismic receivers of any of FIGS. 20-24, in accordance with one or more embodiments of the present disclosure.

By measuring spatial gradients of pressure and particle velocity on a seismic receiver node coupled to the seabed, the computer system 40 may perform a variety of types of seismic data processing for a range of applications. FIG. 25 illustrates a general process flow diagram of a method 300 for processing seismic data acquired by one or more types of seismic receivers 26 depicted in FIGS. 20-24.

Generally, the method 300 may include using the computer system 40 or other suitable device to receive seismic data acquired via one or more seismic receivers 26, such that each seismic receiver 26 may include a 4C sensor and at least one other sensor at a horizontal gradient, as described above with reference to FIGS. 20-24.

At block 304, the computer system 40 may process the acquired seismic data with the data acquired by each respective sensor disposed within or around the respective seismic receiver 26. The seismic data processing may include without limitation source-side reconstruction, receiver-side reconstruction, noise attenuation, wavefield separation, interpolation, imaging operations, and/or the like. The processed seismic data may be employed to identify hydrocarbon deposits in the earth, such that hydrocarbon exploration and extraction equipment (e.g., drill, pumps) may be installed near the location of the hydrocarbon deposits to produce the hydrocarbons, or other subterranean feature(s) of interest.

After processing the seismic data, the computer system 40 may display the processed data or store the processed seismic data in the database 52, a storage component, or the like. By way of example, a few of the seismic data processing operations that may be performed at block 304 are discussed below with respect to a type of seismic receiver design may be best suited to perform the respective operation.

Sparse Acquisition for Increased Efficiency

In shallow water surveys, OBNs are densely deployed in one direction. In this configuration, the nodes are attached by a rope (or deployed as part of a cabled system) and placed every 25 to 50 m. In certain embodiments, the seismic receivers of FIG. 20, 22, or 23 may be used to acquire spatial gradients. The data acquired by these sensors may enable the computer system 40 to reconstruct source-side seismic data while de-noising the seismic data in accordance with the following description.

By acquiring spatial gradients, the seismic receivers 26 may enable the spacing between the nodes of the OBN system to be increased. Using the reconstruction by matching pursuit approach mentioned above, the computer system 40 may represent the pressure and its spatial gradient as the sum of the same basis functions (e.g., an exponential basis function) and may be combined to de-alias the acquired seismic data and reconstruct it on a denser grid according to:

$$\begin{pmatrix} P(x,\omega) \\ \partial_x P(x,\omega) \end{pmatrix} = \begin{pmatrix} 1 \\ -j\omega p_x \end{pmatrix} A e^{j\omega p_x x} \qquad (14)$$

When the spacing between the nodes is increased, the number of nodes per area decreases, thereby extending the spatial coverage of the receiver spread. Consequently, the number of receiver patch deployments can be reduced, which may enable a rolling receiver spread, rather than a series of patch deployments. Furthermore, since the required source areal coverage is larger than the receiver area, the number of redundant/repeated shot points may also be reduced, thereby significantly increasing the efficiency of shallow water OBN acquisition.

While reconstructing the pressure field, the computer system 40 may also reconstruct the horizontal component of particle velocity/acceleration in the water 16 can also be reconstructed using equation 12, such that:

$$A_x(\omega, p) = \frac{-1}{\rho_w} p_x P \qquad (15)$$

This estimated horizontal component of acceleration/particle velocity in water can be combined with the horizontal component measured in the water-bottom (i.e., using the OBN) to infer the medium properties of the seabed.

Up and Down Separation by Matching Pursuit for Sparse Configuration

In certain embodiments, the seismic receivers 26 of FIG. 20, 22, or 23 may be used to acquire a horizontal gradient of the pressure field that can be measured by the sensors within the respective seismic receivers 26. The data acquired by these sensors may enable the computer system 40 to estimate separate up-going and down-going components in the seismic data using the matching pursuit method in accordance with the following description.

As discussed above, separating up-going and down-going wavefields from the seismic data may be part of the processing of multicomponent seabed data where the up-going pressure field $P^-$ (reflections from the subsurface) is separated from the down-going pressure field $P^+$ (surface-related multiples) by combining pressure and vertical component measurements in the water column:

$$P^+ = \frac{1}{2}P + \frac{\rho_w}{2q_w}v_z \qquad (16)$$
$$P^- = \frac{1}{2}P - \frac{\rho_w}{2q_w}v_z$$

where $q_w = \sqrt{\frac{1}{c_w^2} - p_x^2}$ is the vertical slowness, $c_w$ and $\rho_w$ are the wavespeed and density of the water, respectively. If the computer system 40 receives pressure gradient data from the seismic receivers 26, the computer system 40 may reconstruct and decompose the pressure field in a sparser configuration, such that the seismic data is separated into the up- and down-going pressure wavefields as the seismic data is being interpolated. In this case, the up and down separation applied in the shot gather domain, can be formulated as multichannel input data:

$$\begin{pmatrix} P^\pm \\ \partial_x P^\pm \\ v_z^\pm \end{pmatrix} = \begin{pmatrix} 1 \\ -j\omega p_x \\ \dfrac{\pm q_w}{j\omega \rho_w} \end{pmatrix} A e^{j\omega p_x x} \quad (17)$$

These input channels can be used to formulate a cost function that allows the reconstruction of the pressure field in the water. The computer system 40 may decompose the seismic data while reconstructing the seismic data by formulating a cost function for the up-going pressure field that suppresses the down-going wavefield (by attributing the corresponding sign of the vertical slowness to the desired field). Alternatively, the computer system 40 may reconstruct the pressure and vertical particle velocity data separately and retrieve the amplitude from the vertical component. Depending on the sign of the amplitude, the reconstructed basis function can be identified as up-going or down-going. In both approaches, the computer system 40 may calibrate the vertical component of particle velocity. Generally, the calibration takes into account the difference in coupling as well as the fact that the particle velocity is measured at the water bottom 30 (e.g., seafloor or seabed) and not in the water 16.

Coherent Noise Attenuation by Matching Pursuit for Sparse Configuration

In certain embodiments, the seismic receivers 26 of FIG. 21, 23, or 24 may be used to acquire a horizontal gradient of the vertical particle velocity that can be measured by the sensors within the respective seismic receivers 26. The data acquired by these sensors may enable the computer system 40 to attenuate coherent noise in the seismic data using a matching pursuit method in accordance with the following description.

In a shallow water environment, the wavefield generated by a seismic source interacts with the water bottom 30 (e.g., seafloor or seabed) in the near-field. As a result, Scholte waves (also known as mud-roll) and guided waves may be excited. Generally, the seismic data acquired in this type of environment (e.g., the Persian Gulf and the Red Sea) share many similarities with land data. Specifically, the low-frequency slowly-propagating Scholte waves have similar properties to those of ground-rolls present in land seismic surveys. Therefore, noise attenuation methods based on gradients developed for sparse land acquisition (where conventional array-based methods fail) are also be applicable for shallow water environments.

For example, when performing noise attenuation by matching pursuit (El Allouche et al., 2015), the computer system 40 may separate aliased coherent noise while reconstructing the multicomponent input data. The separation is based on a wavenumber filter, where noise is expected to be dominant in a specific frequency-wavenumber (or slowness) range, which may be outside the signal cone. As such, the noise attenuation method may keep the signal in the residual signal and subtract the more energetic noise from the residual signal. This workflow, as described by El Allouche et al. (2015), is valid for the existing multicomponent OBN and OBC systems where there are no available spatial gradients. However, for the OBN with seismic receiver designs illustrated in FIGS. 22-24, this approach can be extended to the pressure gradient (in a similar manner as equation 14) or equivalently to the vertical particle velocity gradient $$\begin{pmatrix} v_z(x, \omega) \\ \partial_x v_z(x, \omega) \\ P(x, \omega) \end{pmatrix} = \begin{pmatrix} C(\omega) \\ -j\omega p_x C(\omega) \\ \dfrac{\pm \rho_w}{j\omega q_w} \end{pmatrix} A e^{j\omega p_x x} \quad (18)$$

where $C(\omega)$ denotes the coupling filter accounting for differences in coupling between the hydrophone and the geophone.

By adding more channels, the computer system 40 may constrain the problem of de-aliasing. That is, because the coherent noise is expected to be present on the pressure as well as the particle velocity (noise exist in the same wavenumber range but with different phase and amplitude), the computer system 40 may attenuate the noise on all components even in the case of having one spatial gradient. This is possible because the computer system 40 can combine one multichannel cost function (e.g. pressure and pressure gradient) aimed at defining the optimum wavenumber with a single channel cost function aimed at determining the phase and amplitude for each component individually (vertical and horizontal particle velocity). The computer system 40 may identify the noise on the multichannel cost function and may subsequently subtract the noise from each component separately using the single channel cost function.

Coherent Noise Attenuation by Adaptive Subtraction

In other embodiments, the seismic receivers 26 of FIGS. 20-24 may be used to acquire a horizontal gradient of the vertical particle velocity or the pressure that can be measured by the sensors within the respective seismic receivers 26. The data acquired by these sensors may enable the computer system 40 to estimate seabed properties and attenuate noise in the seismic data using adaptive subtraction in accordance with the following description.

Using the acquired seismic data, the computer system 40 may address the coherent noise (e.g., Scholte waves and guided waves) using noise attenuation by adaptive subtraction. For instance, the computer system 40 may use the estimates of the horizontal gradients of the vertical particle velocity or pressure to provide a scaled version of the same physical quantity. In some embodiments, the scaling may correspond to the horizontal wavenumber, as described in equations 13.

Since the coherent noise described above is slower than reflections from the subsurface, the computer system 40 may scale the horizontal gradients of the vertical particle velocity or the pressure with greater values. As such, the gradient estimate, which may be dominated mainly by coherent noise, may be used as a noise reference that can be adaptively subtracted from the pressure or particle velocity wavefields (Edme et al., 2011). In this way, the analysis is performed trace-by-trace and therefore is independent of the spatial sampling.

As discussed above, in addition to the Scholte wave and guided waves, another type of coherent noise that may be present on the vertical component may be known as "shear noise on the vertical." This noise may generally be attributed to bad coupling and/or to scattering from small heterogeneities near the seismic receiver 26 (Paffenholtz et al., 2006). By acquiring the horizontal gradients of the vertical component in two directions (e.g., OBN shown in FIG. 23), the computer system 40 may estimate a noise reference of the slowly propagating shear wave and may adaptively subtract the noise reference from the vertical component.

Seabed Properties Estimation and P- and S-Wave Separation by Matching Pursuit

In other embodiments of the present disclosure, the seismic receivers 26 of FIGS. 20, 22, and 23 may be used to acquire a horizontal gradient of the pressure field that can be measured by the sensors within the respective seismic receivers 26. The data acquired by these sensors may enable the computer system 40 to estimate seabed properties and perform P-wave and S-wave separation in accordance with the following description.

With the foregoing in mind, it should be noted that elastic separation of the wavefield into pressure-waves (P-waves) and shear-waves (S-waves) may not be performed while the seismic data acquired at the seabed is being processed. As such, the computer system 40 may assume that the horizontal component contains all of the S-waves and the vertical component contains all of the P-waves. A proper elastic separation, however, may involve data regarding medium parameters at the water-seabed interface.

Schalkwijk et al. (2008) showed that the spatial gradient of the pressure field is related to the horizontal component of the particle velocity according to:

$$\partial_x P(\omega, p_x) = -j\omega \rho (v_x^P - 2 c_s^2 p_x^2 v_x) \qquad (19)$$

Hence, by acquiring the spatial gradient of the pressure field, the computer system 40 may then estimate the S-wave velocity ($c_s$). In embodiments, the P-wave velocity can be estimated by applying a time window on an event identified on the pressure and the vertical component data as described by Schalkwijk et al. (2003). After the seabed medium parameters are estimated, the computer system 40 may separate the up-going P- and S-wave using the matching pursuit approach. For each iteration n, the computer system 40 may thus determine:

$$P_n^{up}(\omega, p) = \qquad (20)$$

$$-\frac{p_x}{2q_p} P_n(\omega, p) + C(\omega)\left[\frac{\omega p}{k_z} v_{z,n}(\omega, p) + \frac{c_s^{-2} - 2p_x^2}{2q_p} v_{x,n}(\omega, p)\right]$$

$$S_n^{up}(\omega, p) = -\frac{p_x}{2q_p} P_n(\omega, p) +$$

$$C(\omega)\rho_s c_s^2 \left[v_{z,n}(\omega, p) - \frac{c_s^{-2} - 2p_x^2}{2q_p} v_{x,n}(\omega, p)\right]$$

$P_n(\omega, p)$, $v_{x,n}(\omega, p)$ and $v_{z,n}(\omega, p)$ are the components of the input wavefield solved for at the $n^{th}$ matching pursuit iteration, and $P_n^{up}$ and $S_n^{up}$ denote the result of processing these components to give the equivalent up-going P-wave and S-wave, respectively.

Vertical Gradient Measuring Seismic Receivers

Figure 27:
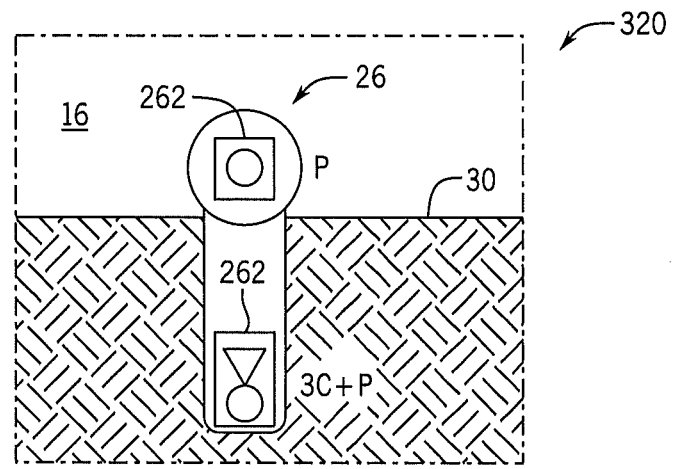
FIG. 27 illustrates a block diagram of a seventh embodiment of a seismic receiver that may be used in the seismic marine survey arrangement of FIG. 1, in accordance with one or more embodiments of the present disclosure.
Figure 28:
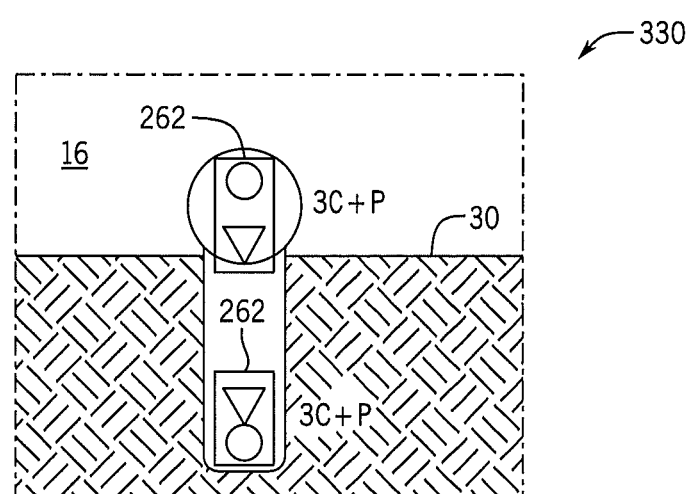
FIG. 28 illustrates a block diagram of an eighth embodiment of a seismic receiver that may be used in the seismic marine survey arrangement of FIG. 1, in accordance with one or more embodiments of the present disclosure.

In addition or alternative to the seismic receiver designs described in FIGS. 20-24, other types of designs may be incorporated within the seismic receiver 26. For example, FIGS. 26-28 illustrate various designs in which the seismic receiver 26 may include a 4C sensor and at least one additional sensor disposed to measure a vertical gradient.

Figure 26:
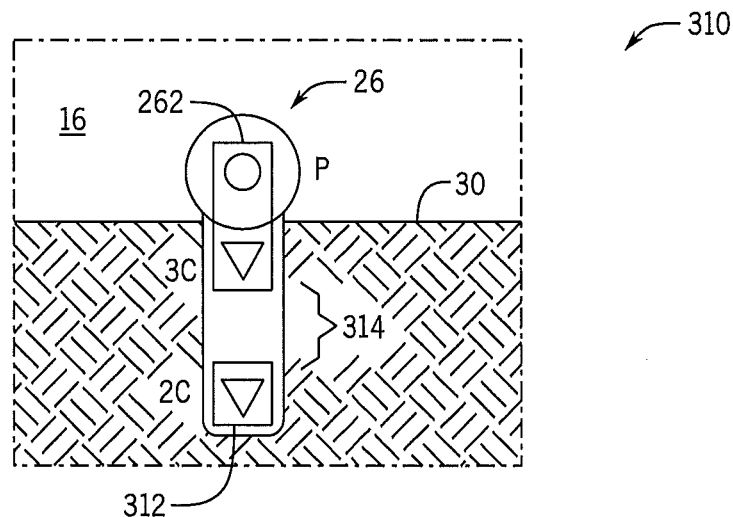
FIG. 26 illustrates a block diagram of a sixth embodiment of a seismic receiver that may be used in the seismic marine survey arrangement of FIG. 1, in accordance with one or more embodiments of the present disclosure.

Referring first to FIG. 26, a side view 310 of an example seismic receiver 26 depicts the 4C sensor 262 disposed at or near the surface of the water bottom 30 (e.g., seafloor or seabed) and a 2C sensor disposed vertically underneath the 4C sensor 262 by a distance 314. The seismic receiver 26 of FIG. 26 may thus measure the vertical gradients, which may be used to estimate the P-wave and S-wave velocities at the seabed.

That is, similar to the free-surface on land, the boundary conditions at the water bottom 30 (e.g., seafloor or seabed) may include the vanishing of the tangential components of stress resulting in the following relations between the spatial gradients of the translational wavefield:

$$\partial_z v_x = -\partial_x v_z$$

$$\partial_z v_y = -\partial_y v_z \qquad (21)$$

Consequently, the computer system 40 may approximate the horizontal spatial gradients by taking the difference between two horizontal translational components buried at different vertical levels.

In addition to these applications, the vertical gradients provide the vertical slowness of the P-waves and S-waves depending on the type of the wave according to:

$$\partial_z v_x(\omega, p) = -j\omega q_p v_x,$$

$$\partial_z v_x(\omega, p) = -j\omega q_s v_x \qquad (22)$$

These slownesses are related to the P-wave and S-wave velocities at the seabed (e.g., the water bottom 30, seafloor, or seabed)) according to:

$$q_p = \sqrt{\frac{1}{c_p^2} - p_x^2} \text{ and } q_p = \sqrt{\frac{1}{c_s^2} - p_x^2} \qquad (23)$$

As such, by measuring the vertical gradients with the seismic shown in FIG. 26, the computer system 40 may estimate the P-wave and S-wave velocities at the seabed.

Referring now to FIG. 27, a side view 320 of another design for the seismic receiver 26 includes a pressure sensor 272 disposed at the water bottom 30 (e.g., seafloor or seabed) and the 4C sensor 262 disposed vertically underneath the pressure sensor 272. The pressure sensor 272 and the 4C sensor 262 may correspond, for example, to two hydrophones, such that one is in the water 16 and another one buried under the water bottom 30 (e.g., seafloor or seabed). By measuring the pressure ($P_w$) in the water 16 and at the seabed ($P_w$), the computer system 40 may relate the divergence (sensitive to P-waves) at the seabed to the pressure fields in the water 16 according to:

$$P_w = \frac{1}{K} \nabla \cdot v_w = \rho_w c_w^2 \nabla \cdot v_w \qquad (24)$$

$$P_s = \rho_s \left(c_p^2 - \frac{4}{3} c_s^2\right) \nabla \cdot v_s$$

As a result, the computer system 40 may separate the P-waves and S-waves from the seismic data acquired at the seabed and may constrain the medium parameters estimation.

Referring now to FIG. 28, a side view 320 of another design for the seismic receiver 26 includes a 4C sensor 262 disposed at the water bottom 30 (e.g., seafloor or seabed) and another 4C sensor 262 disposed vertically underneath the 4C sensor 262 disposed at the water bottom 30 (e.g., seafloor or seabed). This configuration is beneficial because the decoupled geophone in water 16 may detect a signal that is proportional to the gradients of the pressure field (see equation 12). As such, the computer system 40 may perform many of the operations discussed above. That is, by recording the pressure and the three components of the particle velocity/acceleration in water 16 and at the water bottom 30 (e.g., seafloor or seabed), the computer system 40 may more effectively estimate seabed properties, the up and down wavefield separation, the P-wave and S-wave separation, and the like.

Figure 29:
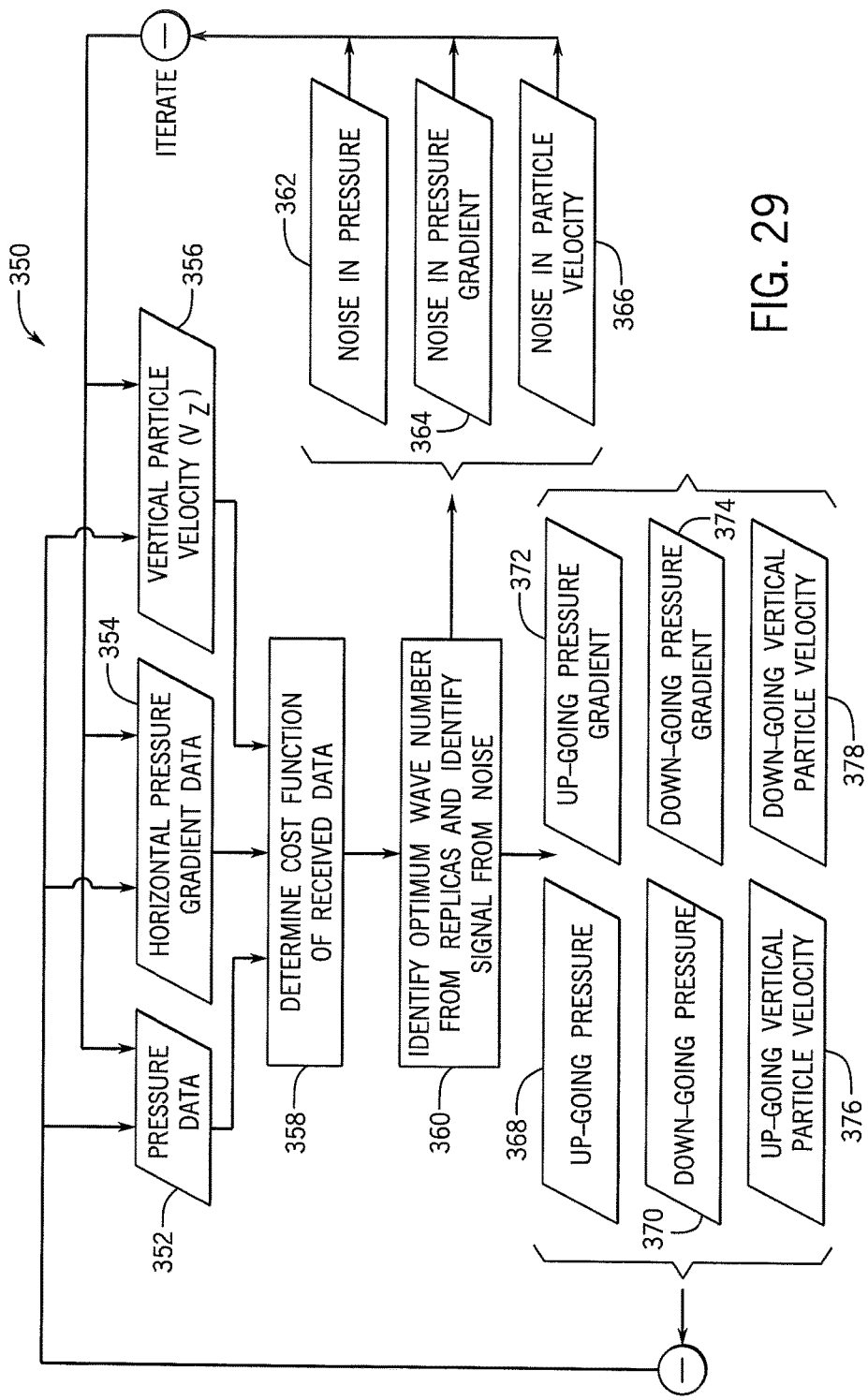
FIG. 29 illustrates a data flow diagram for processing seismic data acquired via (for example) the seismic receivers of any of FIGS. 26-28, in accordance with one or more embodiments of the present disclosure.

With the foregoing in mind, FIG. 29 illustrates a data flow diagram 350 that represents example input data and output data of the various types of systems and methods described herein. Although the data flow diagram 350 illustrates a number of inputs and a number of outputs, it should be understood that the various embodiments of the present disclosure described above may include one or more of each input and output. In addition, the flow data diagram 350 is provided as an example diagram and the embodiments described herein should not be limited to the example data types provided in FIG. 29.

Referring now to FIG. 29, the computer system 40 may receive pressure data 352, horizontal pressure gradient data 354, vertical particle velocity 356, or any combination of these inputs. The computer system 40 may then determine a cost function of the received data at block 358, as described above. Based on the cost function, the computer system 40 may identify (block 360) optimum wavenumbers from replicas present in the received data and distinguish the signal components from the noise components in the received data, as described above.

At each iteration, based on the wavenumber, identified signal, and identified noise, the computer system 40 may output noise in pressure data 362, noise in pressure gradient data 364, and noise in particle velocity data 366. These outputs are subtracted from the pressure data 352, the horizontal pressure gradient data 354, and the vertical particle velocity data, respectively.

In addition, based on the wavenumber, identified signal, and identified noise, the computer system 40 may output up-going pressure data 368, down-going pressure data 370, up-going pressure gradient data 372, down-going pressure gradient data 374, up-going vertical particle velocity data 376, and down-going vertical particle velocity data 378. These outputs are subtracted from the corresponding input data. The process described in the data flow diagram 350 may be iteratively performed until the seismic data is determined to accurately represent the desired wavefields.

Reference throughout this specification to "one embodiment," "an embodiment," "embodiments," "some embodiments," or similar language means that a particular feature, structure, or characteristic described in connection with the embodiment(s) may be included in at least one embodiment of the present disclosure. Appearances of these phrases throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

What is claimed is:

1. A method, comprising:
   receiving, via a processor, seismic data acquired via a seismic survey comprising:
   a plurality of seismic sources emitting a plurality of seismic wavefields at a plurality of locations, wherein each of the plurality of the seismic sources is configured to change a directivity pattern of a respective seismic wavefield based on a respective location of the respective seismic source; and
   one or more seismic receivers configured to receive the seismic data;
   generating, via the processor, one or more basis functions that correspond to one or more measurements of the seismic data;
   modelling, via the processor, a signal component of the seismic data as a sum of the one or more basis functions;
   storing, via the processor, the signal component in a storage component, wherein the signal component is used to acquire an image of a subsurface region of the earth for identifying a feature in the subsurface region of the earth;
   converting, via the processor, the seismic data into a combined source-receiver domain, thereby generating converted seismic data; and
   transforming the converted seismic data into a cost function comprising a slowness of the seismic data observed in the combined source-receiver domain.

2. The method of claim 1, wherein the seismic data is received via two or more seismic receivers, and wherein each of the two or more seismic receivers records at least one component of at least one of the plurality of wavefields and at least one spatial gradient of the at least one component of the at least one of the plurality of wavefields.

3. The method of claim 1, comprising
   interpolating, via the processor, a plurality of signal components for two or more locations that do not correspond to the plurality of locations based on the signal component.

4. The method of claim 1, comprising
   classifying, via the processor, each of the one or more basis functions as part of the signal component of the seismic data or as part of a noise component of the seismic data.

5. The method of claim 4, comprising
   modelling, via the processor, a noise component signal of the seismic data based on at least one of the one or more basis functions identified as being part of the noise component.

6. The method of claim 1, comprising
   classifying a portion of the cost function as the signal component in response to the portion having an apparent slowness between a range of slowness values.

7. The method of claim 1, comprising
   classifying a portion of the cost function as a noise component in response to the portion having an apparent slowness that is either lower than a first threshold or greater than a second threshold.

8. A method, comprising:
   receiving, via a processor, seismic data acquired via a seismic survey comprising:
   a plurality of seismic sources emitting a plurality of seismic wavefields at a plurality of locations, wherein each of the plurality of the seismic sources is configured to change a directivity pattern of a respective seismic wavefield based on a respective location of the respective seismic source; and
   one or more seismic receivers configured to receive the seismic data, wherein each of the one or more seismic receivers is configured to record two or more components of at least one of the plurality of seismic wavefields;

generating, via the processor, one or more basis functions that correspond to one or more measurements of the seismic data;

combining, via the processor, the one or more basis functions corresponding to the two or more components based on a relationship between the two or more components;

generating, via the processor, a set of basis functions that corresponds to the two or more components, wherein the set of basis functions corresponds to one or more wavefield functions separated from the one or more basis functions;

modelling, via the processor, a signal component of the seismic data as a sum of the one or more basis functions;

modelling, via the processor, the signal component of the seismic data based on the sum of the one or more basis functions and the two or more components of at least one of the plurality of seismic wavefields; and storing, via the processor, the signal component in a storage component, wherein the signal component is used to acquire an image of a subsurface region of the earth for identifying a feature in the subsurface region of the earth.

9. The method of claim 8, wherein the relationship between the two or more components corresponds to a relationship between a pressure component and a vertical particle velocity component.

10. The method of claim 8, wherein the relationship between the two or more components corresponds to a relationship between up-going and down-going wavefield components.

11. The method of claim 8, wherein the relationship between the two or more components corresponds to a relationship between at least two of:
a pressure component;
a first particle velocity component;
a second particle velocity component; and
a vertical particle velocity component.

12. The method of claim 1, wherein the seismic data is received by two or more seismic receivers, and wherein an average distance between the two or more seismic receivers is greater than about 100 meters.

13. A non-transitory computer-readable medium comprising
computer-executable instructions that, when executed, cause a processor to:
receive seismic data acquired via a seismic survey comprising:
a plurality of seismic sources emitting a plurality of seismic wavefields at a plurality of locations, wherein each of the plurality of the seismic sources is configured to change a directivity pattern of a respective seismic wavefield based on a respective location of the respective seismic source; and
one or more seismic receivers configured to receive the seismic data, wherein each of the one or more seismic receivers is configured to record the two or more components of at least one of the plurality of seismic wavefields;
generate a first set of basis functions that corresponds to one or more measurements of the seismic data;
combine the first set of basis functions corresponding to the two or more components based on a relationship between the two or more components;
generate a second set of basis functions that corresponds to the two or more components, wherein the second set of basis functions corresponds to one or more wavefield functions separated from the first set of basis functions;
model a signal component of the seismic data as a sum of the second set of basis functions; and
store the signal component in a storage component, wherein the signal component is used to acquire an image of a subsurface region of the earth for identifying a feature in the subsurface region of the earth.

14. The non-transitory computer-readable medium of claim 13, wherein the relationship further comprises a relationship between up and down going pressure waves and shear waves.

15. The non-transitory computer-readable medium of claim 13, wherein the computer-executable instructions, when executed, cause the processor to interpolate one or more seismic datasets further based on the second set of basis functions, wherein the one or more seismic datasets correspond to one or more locations that do not correspond to the plurality of locations.

16. The non-transitory computer-readable medium of claim 13, wherein each respective location of the plurality of locations is at least about 50 meters away from at least one other location of the plurality of locations, and wherein the at least one other location is adjacent to the respective location.

17. The non-transitory computer-readable medium of claim 13, comprising
two or more seismic receivers, wherein an average distance between the two or more seismic receivers is greater than about 100 meters.

18. A system, comprising:
a plurality of seismic sources emitting a plurality of seismic wavefields at a plurality of locations, wherein each of the plurality of the seismic sources is configured to change a directivity pattern of a respective seismic wavefield based on a respective location of the respective seismic source;
one or more seismic receivers, wherein the one or more seismic receivers are configured to receive seismic data, and wherein each of the one or more seismic receivers is configured to record two or more components of at least one of the plurality of seismic wavefields;
a processor configured to:
generate a first set of basis functions that corresponds to one or more measurements of the seismic data;
combine the first set of basis functions corresponding to the two or more components based on a relationship between the two or more components;
generate a second set of basis functions that corresponds to the two or more components, wherein the second set of basis functions corresponds to one or more wavefield functions separated from the first set of basis functions;
model a signal component of the seismic data as a sum of the second set of basis functions; and
store the signal component in a storage component, wherein the signal component is used to acquire an image of a subsurface region of the earth for identifying one or more features in the subsurface region of the earth.

\* \* \* \* \*